(12) United States Patent  
Mochizuki

(10) Patent No.: US 9,103,359 B2  
(45) Date of Patent: Aug. 11, 2015

(54) HYDROSTATIC TRANSMISSION

(71) Applicant: Kanzaki Kokyukoki Mfg. Co., Ltd., Hyogo (JP)

(72) Inventor: Yasuhisa Mochizuki, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 386 days.

(21) Appl. No.: 13/754,559

(22) Filed: Jan. 30, 2013

(65) Prior Publication Data

US 2013/0205766 A1    Aug. 15, 2013

(30) Foreign Application Priority Data

Feb. 9, 2012   (JP) .................................. 2012-26394

(51) Int. Cl.
*F16H 61/4139*   (2010.01)
*F15B 21/00*   (2006.01)
*F16H 61/4078*   (2010.01)

(52) U.S. Cl.
CPC ............ *F15B 21/00* (2013.01); *F16H 61/4078* (2013.01); *F16H 61/4139* (2013.01)

(58) Field of Classification Search
CPC ......... F15B 21/00; F16H 39/04; F16H 39/06; F16H 39/42; F16H 61/4078; F16H 61/4139
USPC .......................................... 60/488, 464, 487
See application file for complete search history.

(56) References Cited

U.S. PATENT DOCUMENTS

| | | | | |
|---|---|---|---|---|
| 3,748,859 A | * | 7/1973 | Pruvot ............................ | 60/488 |
| 4,548,036 A | * | 10/1985 | Matsuda et al. ................ | 60/464 |
| 4,674,287 A | * | 6/1987 | Ishimori et al. ................ | 60/469 |
| 7,334,404 B2 | * | 2/2008 | Sakikawa et al. .............. | 60/486 |
| 8,800,279 B2 | * | 8/2014 | Kita et al. ....................... | 60/488 |
| 8,820,065 B2 | * | 9/2014 | Heren ............................. | 60/424 |

FOREIGN PATENT DOCUMENTS

JP            07158730 A    *    6/1995

* cited by examiner

*Primary Examiner* — Thomas E Lazo
(74) *Attorney, Agent, or Firm* — Sterne, Kessler, Goldstein & Fox P.L.L.C.

(57) ABSTRACT

A hydrostatic transmission comprises a hydraulic pump, a hydraulic motor, first and second main fluid passages fluidly connecting the hydraulic pump to the hydraulic motor so as to constitute a closed fluid circuit, a charge fluid passage, a plurality of first charge check valves and a plurality of second charge check valves. The plurality of first charge check valves are interposed between the charge fluid passage and the first main fluid passage so as to allow only flow of fluid from the charge fluid passage to the first main fluid passage when the first main fluid passage is hydraulically depressed relative to the charge fluid passage. The plurality of second charge check valves are interposed between the charge fluid passage and the second main fluid passage so as to allow only flow of fluid from the charge fluid passage to the second main fluid passage when the second main fluid passage is hydraulically depressed relative to the charge fluid passage.

10 Claims, 12 Drawing Sheets

HYDROSTATIC TRANSMISSION

BACKGROUND OF THE INVENTION

1. Field of the Invention

The present invention relates to a hydrostatic transmission (hereinafter, referred to as "HST") including a hydraulic pump, a hydraulic motor, a pair of main fluid passages interposed between the hydraulic pump and the hydraulic motor so as to constitute a closed fluid circuit, and charge check valves for supplying fluid to the main fluid passages of the closed fluid circuit.

2. Related Art

There is a well-known conventional transmission system referred to as a "hydraulic mechanical transmission (hereinafter, referred to as "HMT")" that is a combination of an HST and a planetary gear mechanism. The HMT is used to output high power for driving a large vehicle, e.g., a tractor, a wheel loader and a truck. However, the main fluid passages of the HST are liable to leak fluid because they are subjected to high fluid pressures to ensure the high output power of the HMT. To avoid the fluid leak, the main fluid passages must have a high quality in fluidal tightness and in strength so as to withstand the high pressure of fluid, however, it is expensive to make such main fluid passages.

Then, the HST has been considered to have an effective means for recovering the fluid leak from the main fluid passages and for supplying the recovered fluid to the main fluid passages. A typical means is a charge pump driven together with a hydraulic pump of the HST by an engine. However, the charge pump has a problem that when a vehicle is parked on a slope while stopping an engine, fluid leaks from the main fluid passages rapidly and the pressure of fluid in the main fluid passages becomes insufficient to hold the stationary vehicle so that the parked vehicle may unexpectedly descend the slope because the charge pump cannot be driven by the engine to compensate for the lack of pressure of fluid in the main fluid passages.

Therefore, as disclosed by JP H7-158730 A, the HST may be provided with an orifice in addition to the charge pump. This orifice siphons fluid from a fluid sump into the main fluid passages because of hydraulic depression of the main fluid passages caused by rotation of a hydraulic motor of the HST following the descent of the vehicle. In this regard, the HST is provided with a pair of charge check valves each of which can be opened to allow fluid to flow into the corresponding main fluid passage when the corresponding main fluid passage is hydraulically depressed relative to a charge fluid passage on the upstream side of the charge check valve. The fluid siphoned by the orifice is supplied to the hydraulically depressed main fluid passage via the opened charge check valve.

However, the fluid supply by use of the orifice is still insufficient to ensure the high output power of the HMT. In this regard, each fluid passage between each charge check valve and each main fluid passage has a constant sectional area that cannot be increased to increase flow of fluid charged into the main fluid passage so as to compensate for the shortage of fluid siphoned by the orifice. As a result, the HST of the HMT may have a problem caused by the lack of hydraulic pressure in the main fluid passages, e.g., cavitation that damages related devices and causes noise.

SUMMARY OF THE INVENTION

An object of the invention is to provide an HST that can hold a sufficient hydraulic pressure in its main fluid passages against fluid leak from the main fluid passages so as to ensure a high output power of an apparatus using the HST even if the apparatus using the HST is an HMT.

To achieve the object, an HST according to the invention comprises a hydraulic pump, a hydraulic motor, first and second main fluid passages fluidly connecting the hydraulic pump to the hydraulic motor so as to constitute a closed fluid circuit, a charge fluid passage, a plurality of first charge check valves and a plurality of second charge check valves. The plurality of first charge check valves are interposed between the charge fluid passage and the first main fluid passage so as to allow fluid to flow from the charge fluid passage to the first main fluid passage when the first main fluid passage is hydraulically depressed relative to the charge fluid passage. The plurality of second charge check valves are interposed between the charge fluid passage and the second main fluid passage so as to allow fluid to flow from the charge fluid passage to the second main fluid passage when the second main fluid passage is hydraulically depressed relative to the charge fluid passage. Therefore, the increase of number of charge check valves increases the total sectional area of fluid passages between the respective first and second charge check valves and the respective first and second main fluid passages, thereby increasing flow of fluid charged into the first and second main fluid passages. Therefore, the HST can properly act even if it is subjected to a great hydraulic pressure in such a case where it is used in an HMT, for example.

In a first aspect of the HST, the HST further comprises a center section onto which the hydraulic pump and the hydraulic motor are mounted. The center section is formed therein with respective holes serving as the first and second main fluid passages and the charge fluid passage. The plurality of first charge check valves include at least one first charge check valve provided in the center section so as to be interposed between the hole serving as the charge fluid passage and the hole serving as the first main fluid passage. The plurality of second charge check valves include at least one second charge check valve provided in the center section so as to be interposed between the hole serving as the charge fluid passage and the hole serving as the second main fluid passage. Therefore, the number of charge check valves disposed outside of the center section is reduced so as to ensure the compactness of the HST.

Preferably, in the first aspect, the hole serving as the charge fluid passage is disposed between the hole serving as the first main fluid passage and the hole serving as the second main fluid passage. A first charge port is formed in the center section so as to extend from the hole serving as the charge fluid passage to the at least one first charge check valve. A second charge port is formed in the center section so as to extend opposite to the first charge port from the hole serving as the charge fluid passage to the at least one second charge check valve. Therefore, the hole serving as the charge fluid passage approaches the holes serving as the first and second main fluid passages so as to reduce the lengths of the first and second charge ports, thereby ensuring the compactness of the center section and reducing costs for making fluid holes and ports.

Further preferably, the holes serving as the first and second main fluid passages have respective open ends at an outer surface of the center section. The at least one first charge check valve in the center section is fitted into the open end of the hole serving as the first main fluid passage. The at least one second charge check valve in the center section is fitted into the open end of the hole serving as the second main fluid passage. Therefore, no additional hole other than the holes serving as the first and second main fluid passages has to be formed in the center section to have the at least one first charge check valve and the at least one second charge check valve, thereby reducing costs.

Preferably, in the first aspect, the at least one first charge check valve in the center section is disposed across the hole serving as the first main fluid passage. The at least one second charge check valve in the center section is disposed across the hole serving as the second main fluid passage. Therefore, the center section has sufficiently large spaces for arranging the first and second charge cheek valves while reducing lengths of the holes in the center section serving as the first and second main fluid passages. Further, therefore, even if the holes serving as the first and second main fluid passages do not have open ends at an outer surface of the center section for convenience of inserting the first and second charge check valves into these holes or even if the holes serving as the first and second main fluid passages have open ends at an outer surface of the center section and these open ends cannot be used to insert the first and second charge check valves into these holes, other outer surfaces of the center section can be used to ensure openings for providing the at least one first charge check valve and the at least one second charge check valve in the center section across the respective holes serving as the first and second main fluid passages, thereby increasing variation of arrangement of the charge check valves in the center section.

Preferably, in the first aspect, a charge check valve enlargement unit is detachably attached to the center section. Respective holes serving as the first and second main fluid passages and the charge fluid passage are provided in the charge check valve enlargement unit so as to be joined to the respective holes in the center section, thereby constituting the first and second main fluid passages and the charge fluid passage. One of the plurality of first charge check valves is provided in the charge check valve enlargement unit so as to be interposed between the hole in the charge check valve enlargement unit serving as the charge fluid passage and the hole in the charge check valve enlargement unit serving as the first main fluid passage. One of the plurality of second charge check valves is provided in the charge check valve enlargement unit so as to be interposed between the hole in the charge check valve enlargement unit serving as the charge fluid passage and the hole in the charge check valve enlargement unit serving as the second main fluid passage. Therefore, the number of the first and second charge check valves can be easily adjusted by attaching or detaching the charge check valve enlargement unit to and from the center section, thereby standardizing the center section.

Further preferably, in the joined center section and charge check valve enlargement unit, the joined holes serving as the charge fluid passage are disposed between the joined holes serving as the first main fluid passage and the joined holes serving as the second main fluid passage. A first charge port is provided in the charge check valve enlargement unit so as to extend from the hole in the charge check valve enlargement unit serving as the charge fluid passage to the first charge check valve in the charge check valve enlargement unit. A second charge port is provided in the charge check valve enlargement unit so as to extend opposite to the first charge port from the hole in the charge check valve enlargement unit serving as the charge fluid passage to the second charge check valve in the charge check valve enlargement unit. Therefore, the center section and the charge check valve enlargement unit are configured so that the first and second main fluid passages approach the charge fluid passage so as to reduce lengths of the first and second charge ports in the charge check valve enlargement unit.

Preferably, the first charge check valve in the charge check valve enlargement unit is disposed across the hole in the charge check valve enlargement unit serving as the first main fluid passage. The second charge check valve in the charge check valve enlargement unit is disposed across the hole in the charge check valve enlargement unit serving as the second main fluid passage. Therefore, the charge check valve enlargement unit has sufficiently large spaces for arranging the first and second charge check valves while reducing lengths of the holes in the charge check valve enlargement units serving as the first and second main fluid passages.

Preferably, the charge check valve enlargement unit attached to the center section is multiplied. Therefore, the number of first and second charge check valves is easily increased by multiplying the charge check valve enlargement unit, thereby simplifying, standardizing and minimizing the center section.

In a second aspect of the HST, the plurality of first charge check valves include a first charge check valve assembly that functions as the first charge check valve for supplying fluid from the charge fluid passage to the first main fluid passage and that also functions as a relief valve for releasing excessive fluid from the first main fluid passage to the charge fluid passage. The plurality of second charge check valves include a second charge check valve assembly that functions as the second charge check valve for supplying fluid from the charge fluid passage to the second main fluid passage and that also functions as a relief valve for releasing excessive fluid from the second main fluid passage to the charge fluid passage. Therefore, no additional relief valve has to be provided in addition to each of the first and second charge check and relief valve assemblies, thereby reducing the number of valves.

These, further and other objects, features and advantages of the invention will appear more fully in the following description with reference to the attached drawings.

DETAILED DESCRIPTION OF THE INVENTION

Figure 1:
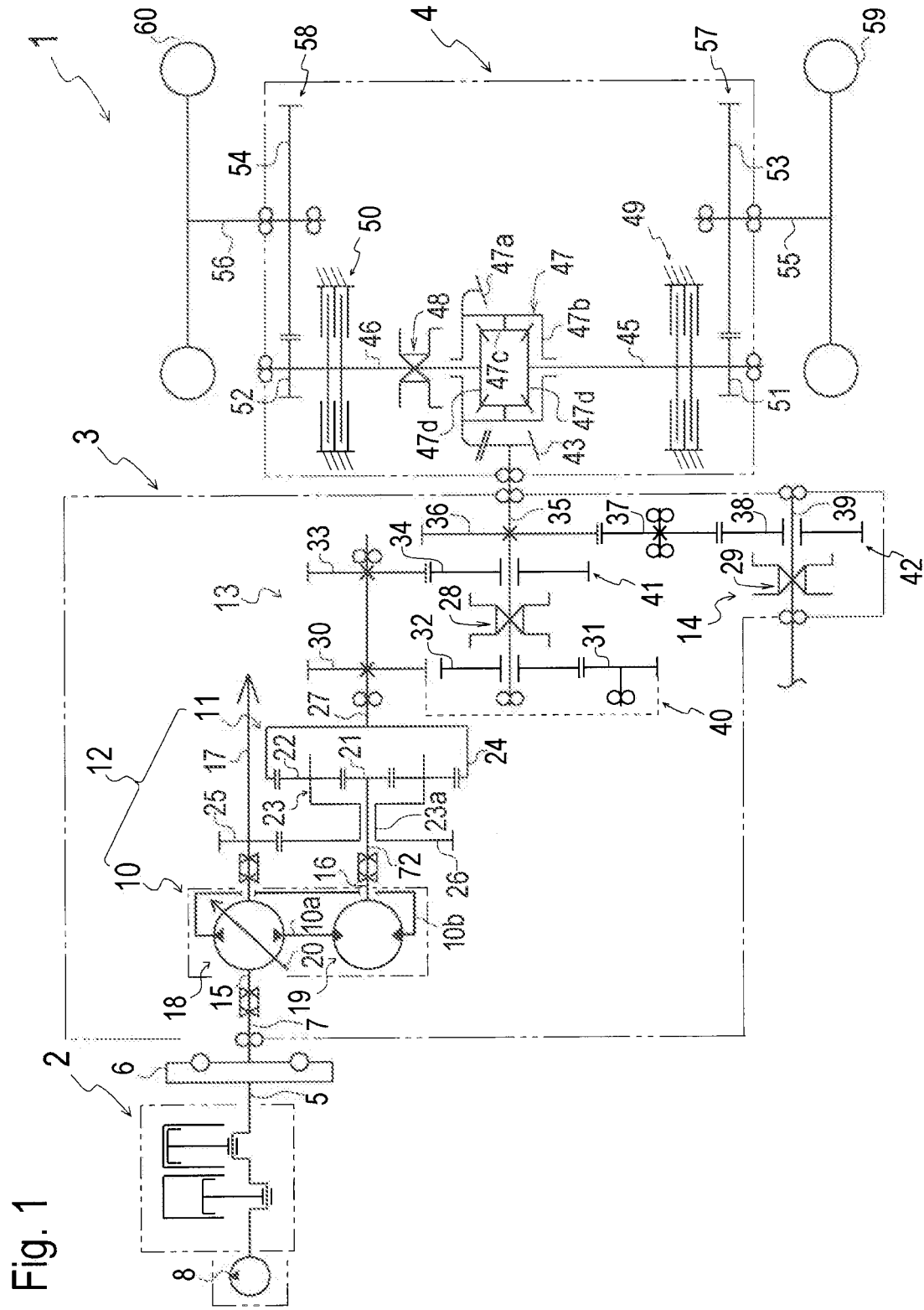
FIG. 1 is a skeleton diagram of a vehicle 1 equipped with an HST 10 according to the invention.

Referring to FIG. 1, a vehicle 1 is equipped with an engine 2, a transmission casing 3, a transaxle casing 4, and drive wheels 59 and 60 supported by transaxle casing 4. In this embodiment, drive wheels 59 and 60 serve as left and right rear wheels of vehicle 1, transaxle casing 4 serves as a rear transaxle casing supporting rear drive wheels 59 and 60, and vehicle 1 is equipped with an unshown front transaxle casing supporting unshown front wheels.

Engine 2 has an output shaft 5. An input shaft 7 projects outward from transmission casing 3. Input shaft 7 is drivingly connected to output shaft 5 via a rotary damper 6 for reducing vibration of output shaft 5 before the torque of output shaft 5 is transmitted to input shaft 7. A crankshaft of engine 2 serving as output shaft 5 projects outward from engine 2 so as to drive a charge pump 8 for supplying fluid to an HST 10 in transmission casing 3.

In transmission casing 3, HST 10 has a pump shaft 15 drivingly connected coaxially to input shaft 7. A PTO transmission shaft 17 for driving a PTO system of vehicle 1 is drivingly connected coaxially to pump shaft 15 opposite to input shaft 7 so as to be rotatably integral with pump shaft 15.

Transmission casing 3 incorporates an HMT 12, a reversing gear transmission 13 and a front wheel driving clutch mechanism 14 for driving the unshown front wheels. Reversing gear transmission 13 is driven by HMT 12 and distributes its output power between a later-discussed differential gear unit 47 in rear transaxle casing 4 and front wheel driving clutch mechanism 14 in transmission casing 3.

HMT 12 includes HST 10 and a planetary gear transmission 11. HST 10 includes a hydraulic pump 18, a hydraulic motor 19 and a pair of main fluid passages 10a and 10b fluidly connecting hydraulic pump 18 to hydraulic motor 19 so as to constitute a closed fluid circuit. Pump shaft 15 of hydraulic pump 18 is driven by engine 2 via shafts 5 and 7. Hydraulic pump 18 delivers fluid to hydraulic motor 19 so as to drive a motor shaft 16 of hydraulic motor 19. Hydraulic pump 18 is provided with a movable swash plate 20. The tilt direction and angle of swash plate 20 are controlled to control the rotary direction and speed of motor shaft 16. More specifically, motor shaft 16 is stopped by setting swash plate 20 at its neutral position. Motor shaft 16 is rotated in one direction by tilting swash plate 20 in one direction from the neutral position, and is rotated in the other direction by tilting swash plate 20 in the other direction from the neutral position.

Planetary gear transmission 11 combines the input power of hydraulic pump 18, i.e., the torque of pump shaft 15, with the output power of hydraulic motor 19, i.e., the torque of motor shaft 16, so as to drive an HMT output shaft 27 by the combined power. Planetary gear transmission 11 includes a sun gear 21, planetary gears 22, a planetary carrier 23 and an internal gear 24. Sun gear 21 is fixed (or formed) on a sun gear shaft 72. Sun gear shaft 72 is drivingly connected coaxially to motor shaft 16 so as to be rotatably integral with motor shaft 16. Internal gear 24 is formed on an inner peripheral edge of a ring gear fixed on HMT output shaft 27. Planetary gears 22 are pivoted on planetary carrier 23 and mesh with sun gear 21 and internal gear 24.

A sleeve portion 23a of planetary carrier 23 is fitted on sun gear shaft 72 so as to be rotatable relative to sun gear shaft 72. A gear 25 is fixed (or formed) on PTO transmission shaft 17, a gear 26 is fixed (or formed) on sleeve portion 23a of planetary carrier 23, and gears 25 and 26 mesh with each other so as to serve as a reduction gear transmission for transmitting the torque of pump shaft 15 of hydraulic pump 18 to planetary carrier 23. The rotation of planetary carrier 23 caused by the torque of pump shaft 15 causes revolution of planetary gears 22 centered on sun gear 21. The rotation of sun gear 21 caused by the torque of motor shaft 16 causes rotation of planetary gears 22 centered on their own pivots on planetary carrier 23. As a result, the revolution and rotation of planetary gears 22 rotate internal gear 24 and HMT output shaft 27.

Due to the above-mentioned structure of HMT 12, the rotary speed of HMT output shaft 27 is zeroed when swash plate 20 is set at the maximum tilt angle in one direction from the neutral position, i.e., when motor shaft 16 rotates at the maximum speed in one direction. The rotary speed of HMT output shaft 27 is increased in one direction as swash plate 20 is moved from the maximum tilt angle in one direction to the maximum tilt angle in the other direction via the neutral position. When swash plate 20 reaches the maximum tilt angle in the other direction, the rotary speed of HMT output shaft 27 reaches its maximum. In this way, HMT output shaft 27 rotates in only one direction, however, the rotary speed range of HMT output shaft 27 is expanded. Therefore, the whole rotary speed range of HMT output shaft 27 is applied to the output rotation of reversing gear transmission 13 in either one or another direction selected by operating a shifter 28 of reversing gear transmission 13.

HMT output shaft 27 is extended to serve as an input shaft of reversing gear transmission 13. Drive gears 30 and 33 are fixed on the extended portion of HMT output shaft 27 serving as the input shaft of reversing gear transmission 13. Reversing gear transmission 13 includes a reverser output shaft 35 extended parallel to HMT output shaft 27. Driven gears 32 and 34 are fitted on reverser output shaft 35 so as to be rotatable relative to reverser output shaft 35. Drive gear 30 meshes with driven gear 32 via a counter gear 31 so that gears 30, 31 and 32 serve as a first directive gear train 40 for rotating drive wheels 59 and 60 in one of forward and backward directions. Drive gear 33 directly meshes with driven gear 34 so that gears 33 and 34 serve as a second directive gear train 41 for rotating drive wheels 59 and 60 in the other of forward and backward directions.

Shifter 28 is fitted on reverser output shaft 35 between driven gears 32 and 34 so as to be unrotatable relative to reverser output shaft 35 and so as to be axially slidable along reverser output shaft 35. When shifter 28 engages with driven gear 32, first directive gear train 40 transmits the torque of HMT output shaft 27 to reverser output shaft 35 so as to rotate reverser output shaft 35 in a first direction. When shifter 28 engages with driven gear 34, second directive gear train 41 transmits the torque of HMT output shaft 27 to reverser output shaft 35 so as to rotate reverser output shaft 35 in a second direction opposite to the first direction. When shifter 28 engages with neither gear 32 nor gear 34, reverser output shaft 35 is isolated from the torque of HMT output shaft 27.

Front wheel driving clutch mechanism 14 includes a clutch shaft 39 that is extended outward from transmission casing 3 to be drivingly connected to the unshown front wheels. In transmission casing 3, a clutch shifter 29 is fitted on clutch shaft 39 so as to be unrotatable relative to clutch shaft 39 and so as to be axially slidable along clutch shaft 39. A gear 36 is fixed on reverser output shaft 35. A gear 38 is fitted on clutch shaft 39 so as to be rotatable relative to clutch shaft 39. Gears 36 and 38 mesh with each other via a counter gear 37 so that gears 36, 37 and 38 serve as a front wheel driving gear train 42. When clutch shifter 29 engages with gear 38, front wheel driving gear train 42 transmits the torque of reverser output shaft 35 to clutch shaft 39 so as to drive the unshown front wheels, thereby setting vehicle 1 in a four-wheel drive mode. When clutch shifter 29 is separated from gear 38, clutch shaft 39 is isolated from the torque of reverser output shaft 35 and front wheel driving gear train 42 so as to set vehicle 1 in a two-wheel drive mode.

An utmost (rear) end of reverser output shaft 35 is extended into rear transaxle casing 4 so as to be fixedly provided thereon with a pinion 43. Differential gear unit 47 is disposed in rear transaxle casing 4 so as to differentially connect right and left axles 55 and 56 of respective drive wheels 59 and 60. Differential gear unit 47 includes a bull gear 43a, a differential casing 47b, at least one differential pinion 47c, differential side gears 47d and differential yoke shafts 45 and 46. Bull gear 43a meshes with pinion 43 so as to serve as an input gear of differential gear unit 47. Differential casing 47b is fixed to bull gear 43a so as to be rotatably integral with bull gear 43a.

At least one differential pinion 47c is pivoted in differential casing 47b. Proximal end portions of left and right differential yoke shafts 45 and 46 are fitted into differential casing 47b so as to be rotatable relative to differential casing 47b, and are fixedly provided thereon with respective differential side gears 47d. At least one differential pinion 47c meshes with left and right differential side gears 47d so as to be rotatable together with differential casing 47b to transmit the rotation of differential casing 47b to differential yoke shafts 45 and 46 and so as to be rotatable centered on its own axis to allow differential rotation of differential yoke shafts 45 and 46.

A differential locking clutch shifter 48 is fitted on one of left and right differential yoke shafts 45 and 46 (in this embodiment, differential yoke shaft 46) so as to be unrotatable relative to differential yoke shaft 46 and so as to be axially slidable along differential yoke shaft 46. When differential locking clutch shifter 48 engages with bull gear 47a (or differential casing 47b), differential yoke shaft 46 is locked to bull gear 47a so as to be locked to other differential yoke shaft 45, thereby canceling the differential rotation of differential yoke shafts 45 and 46. When differential locking clutch shifter 48 is separated from bull gear 47a, differential yoke shaft 46 is allowed to rotate relative to differential casing 47b so as to allow the differential rotation of differential yoke shafts 45 and 46.

In transaxle casing 4, brakes 49 and 50 are provided on respective differential yoke shafts 45 and 46, and gears 51 and 52 are fixed on respective differential yoke shafts 45 and 46. Axle 55 of drive wheel 59 is supported by a left portion of transaxle casing 4, and axle 56 of drive wheel 60 is supported by a right portion of transaxle casing 4. In transaxle casing 4, a gear 53 is fixed on axle 55 and meshes with gear 51 so that gears 51 and 53 serves as a left final reduction gear train 57 for transmitting power from left differential yoke shaft 45 to left axle 55. In transaxle casing 4, a gear 54 is fixed on axle 56 and meshes with gear 52 so that gears 52 and 54 serves as a right final reduction gear train 58 for transmitting power from right differential yoke shaft 46 to right axle 56. Incidentally, brakes 49 and 50 may be operable so that only one of brakes 49 and 50 is applied to enable zero-turn of vehicle 1.

Figure 2:
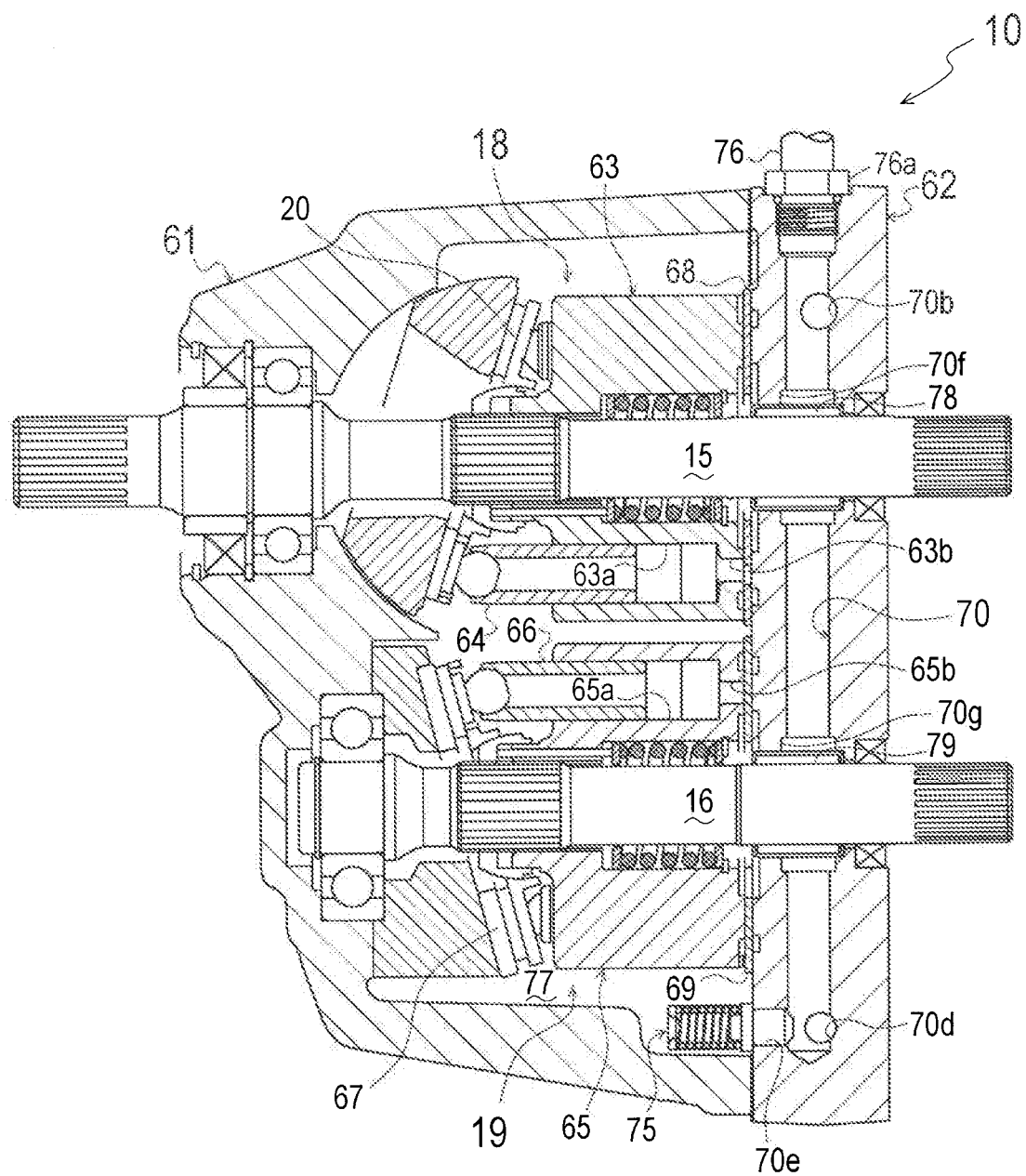
FIG. 2 is a sectional side view of HST 10.
Figure 3:
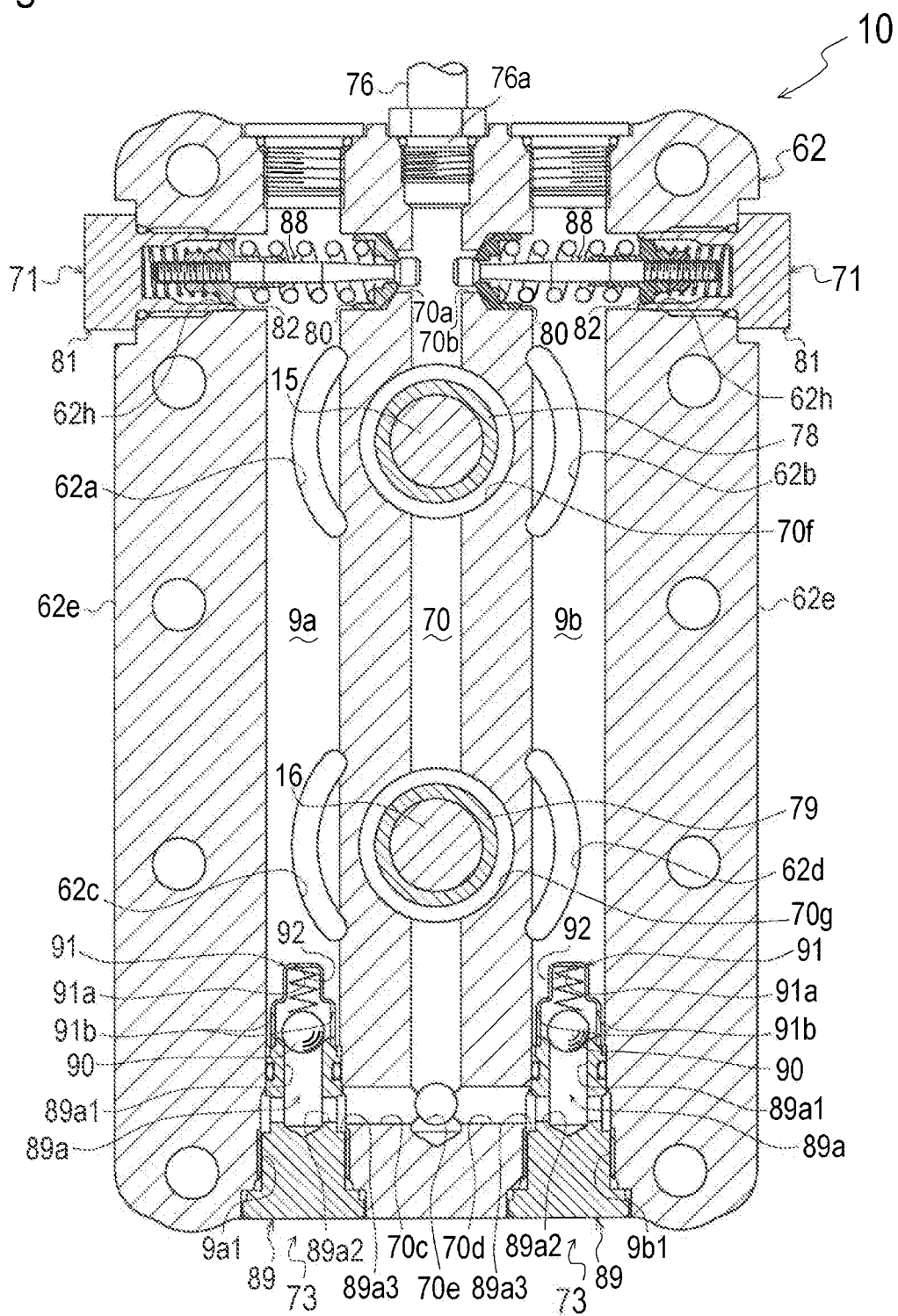
FIG. 3 is a sectional rear view of HST 10.

A basic structure of HST 10 will be described with reference to FIGS. 1 to 5. As shown in FIGS. 2 and 3, HST 10 includes axially piston type hydraulic pump 18 and hydraulic motor 19. Further, HST 10 includes an HST housing 61 and a center section 62 that serve as a part of transmission casing 3. On the assumption HST housing 61 and center section 62 serves as a front part of transmission casing 3, hydraulic pump 18 and hydraulic motor 19 are mounted upper and lower onto a vertical front surface of center section 62 so as to have upper pump shaft 15 and lower motor shaft 16 in the fore-and-aft horizontal direction of vehicle 1. HST housing 61 is fixed at an open rear end thereof to the front surface of center section 62 so as to incorporate hydraulic pump 18 and hydraulic motor 19 mounted on center section 62.

Pump shaft 15 is journalled by HST housing 61 and projects forward from HST housing 61 so as to be drivingly connected to input shaft 7 shown in FIG. 1. Pump shaft 15 is passed through center section 62 and projects rearward from center section 62 so as to be drivingly connected to PTO transmission shaft 17 shown in FIG. 1. Motor shaft 16 is passed through center section 62 and projects rearward from center section 62 so as to be drivingly connected to sun gear shaft 72 shown in FIG. 1.

Hydraulic pump 18 includes movable swash plate 20, a cylinder block 63, plungers 64 and a valve plate 68. Hydraulic motor 19 includes a cylinder block 65, plungers 66, a fixed swash plate 67 and a valve plate 69. Valve plates 68 and 69 are fixed on the vertical front surface of center section 62 so as to pass respective pump and motor shafts 15 and 16 therethrough. Cylinder block 63 is fixed on pump shaft 15, cylinder block 65 is fixed on motor shaft 16, and cylinder blocks 63 and 65 are fitted at rear end surfaces thereof on respective valve plates 68 and 69 so as to be slidably rotatable relative to respective valve plates 68 and 69.

Cylinder bores 63a are formed in cylinder block 63 so as to be aligned radially with respect to pump shaft 15, and plungers 64 are axially (fore-and-aft horizontally) slidably fitted into respective cylinder bores 63a. Cylinder bores 65a are formed in cylinder block 65 so as to be aligned radially with respect to motor shaft 16, and plungers 66 are axially (fore-and-aft horizontally) slidably fitted into respective cylinder bores 65a. Movable swash plate 20 is rotatably supported by HST housing 61 so as to abut against heads (front ends) of plungers 64. Fixed swash plate 67 is fixedly supported by HST housing 61 so as to abut against heads (front ends) of plungers 66.

Cylinder bores 63a are formed at rear ends thereof with respective cylinder ports 63b open rearward on the rear end surface of cylinder block 63. Cylinder bores 65a are formed at rear ends thereof with respective cylinder ports 65b open rearward on the rear end surface of cylinder block 65. Center section 62 is formed therein with left and right parallel vertical main fluid holes 9a and 9b serving as main fluid passages 10a and 10b fluidly connecting hydraulic pump 18 to hydraulic motor 19. Left and right kidney ports 62a and 62b are extended forward from upper portions of respective main fluid holes 9a and 9b and are open at the front surface of center section 62 so as to be fluidly connected to cylinder ports 63b in cylinder block 63 of hydraulic pump 18 via valve plate 68. Left and right kidney ports 62c and 62d are extended forward from lower portions of respective main fluid holes 9a and 9b and are open at the front surface of center section 62 so as to be fluidly connected to cylinder ports 65b in cylinder block 65 of hydraulic motor 19 via valve plate 69.

When cylinder block 63 of hydraulic pump 18 rotates together with pump shaft 15 driven by power from engine 2, one kidney port 62a or 62b functions as a suction port of hydraulic pump 18 to supply fluid from corresponding main fluid hole 9a or 9b to cylinder bores 63a and the other kidney port 62b or 62a functions as a delivery port of hydraulic pump 18 to discharge fluid from cylinder bores 63a to corresponding main fluid hole 9b or 9a, depending on in which direction movable swash plate 20 is tilted from the neutral position. Accordingly, cylinder bores 65a in cylinder block 65 of hydraulic motor 19 are supplied with fluid from one main fluid hole 9a or 9b via corresponding kidney port 62c or 62d and deliver fluid therefrom to the other main fluid hole 9b or 9a via corresponding kidney port 62d or 62c, thereby rotating motor shaft 16 together with cylinder block 65 in one of the opposite directions.

HST 10 having the above-mentioned hydraulic circuit structure is liable to leak fluid from main fluid hole 9a or 9b because HST 10 serves as a high hydraulic pressure loaded part of HMT 12. Therefore, center section 62 is formed therein with a charge fluid hole 70 for supplying fluid to main fluid hole 9a or 9b. In center section 62, vertical charge fluid hole 70 is disposed between left and right vertical main fluid holes 9a and 9b so as to pass upper and lower holes in which pump shaft 15 and motor shaft 16 are disposed respectively. In this regard, the upper hole having pump shaft 15 therein is provided therein with a bush 78 between an inner peripheral surface thereof and an outer peripheral surface of pump shaft 15, and is formed therearound with an annular hole 70f serving as a part of charge fluid hole 70 passing pump shaft 15 and bush 78. Similarly the lower hole having motor shaft 16 therein is provided therein with a bush 79 between an inner peripheral surface thereof and an outer peripheral surface of motor shaft 16, and is formed therearound with an annular hole 70g serving as a part of charge fluid hole 70 passing motor shaft 16 and bush 79.

Charge fluid hole 70 has a closed bottom end above a bottom surface of center section 62, and has a top portion open on a top surface of center section 62. A pipe joint 76a is fitted into the top portion of charge fluid hole 70 and a pipe 76 is extended from pipe joint 76a to a delivery port of charge pump 8 shown in FIG. 1 so as to supply charge fluid hole 70 with fluid delivered from charge pump 8. Therefore, pipe 76 outside of center section 62 and charge fluid hole 70 in center section 62 constitute a charge fluid passage 10c of HST 10 for supplying fluid to main fluid holes 9a and 9b serving as main fluid passages 10a and 10b via later-discussed charge check valves. In this regard, charge pump 8 is provided on engine 2 in the embodiment of FIG. 1. However, charge pump 8 may be disposed at any position in vehicle 1 to supply fluid into charge fluid hole 70 via pipe 76. For example, charge pump 8 may be mounted on a rear surface of center section 62 so that the rear end portion of pump shaft 15 projecting rearward from the rear surface of center section 62 serves as a drive shaft of charge pump 8.

Left and right charge and relief ports 70a and 70b branch leftward and rightward from an upper portion of charge fluid hole 70 to respective left and right main fluid holes 9a and 9b. Left and right charge ports 70c and 70d branch leftward and rightward from a lower portion of charge fluid hole 70 to respective left and right main fluid holes 9a and 9b. A drain port 70e branches forward from the lower portion of charge fluid hole 70 and is open on the front surface of center section 62 to a fluid sump in HST housing 61.

Left and right valve chamber holes 62h are formed in the upper portion of center section 62 (above pump shaft 15) so as to be open on vertical left and right outer side surfaces 62e of center section 62, so as to cross the respective upper portions of main fluid holes 9a and 9b and so as to be connected coaxially to respective charge and relief ports 70a and 70b. Left and right charge check and relief valve assemblies 71 are fitted from left and right side surfaces 62e of center section 62 into respective valve chamber holes 62h so as to be interposed between respective charge and relief ports 70a and 70b and respective main fluid holes 9a and 9b, thereby supplying fluid from charge fluid hole 70 to hydraulically depressed main fluid hole 9a or 9b and thereby releasing fluid from excessively hydraulic pressurized main fluid hole 9a or 9b to charge fluid hole 70.

Further, left and right main fluid holes 9a and 9b are formed at bottom ends thereof (below motor shaft 16) with respective bottom valve chambers 9a1 and 9b1 open downward on the horizontal bottom surface of center section 62. Left and right charge check valves 73 are fitted from the horizontal bottom surface of center section 62 into the respective bottom valve chambers 9a1 and 9b1 at the bottom end portions of main fluid holes 9a and 9b so as to be interposed between respective charge ports 70c and 70d and respective main fluid holes 9a and 9b, thereby supplying fluid from charge fluid hole 70 to hydraulically depressed main fluid hole 9a or 9b.

Figure 4:
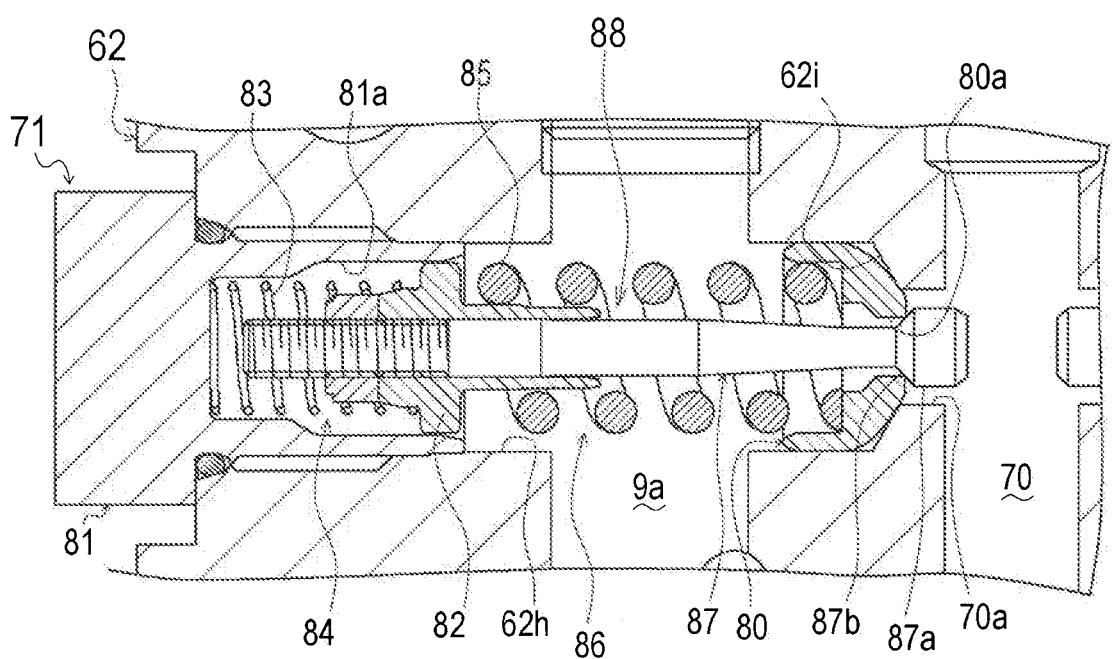
FIG. 4 is a fragmentary sectional rear view of HST 10 showing a representative charge check and relief valve assembly 71 in HST 10.
Figure 5:
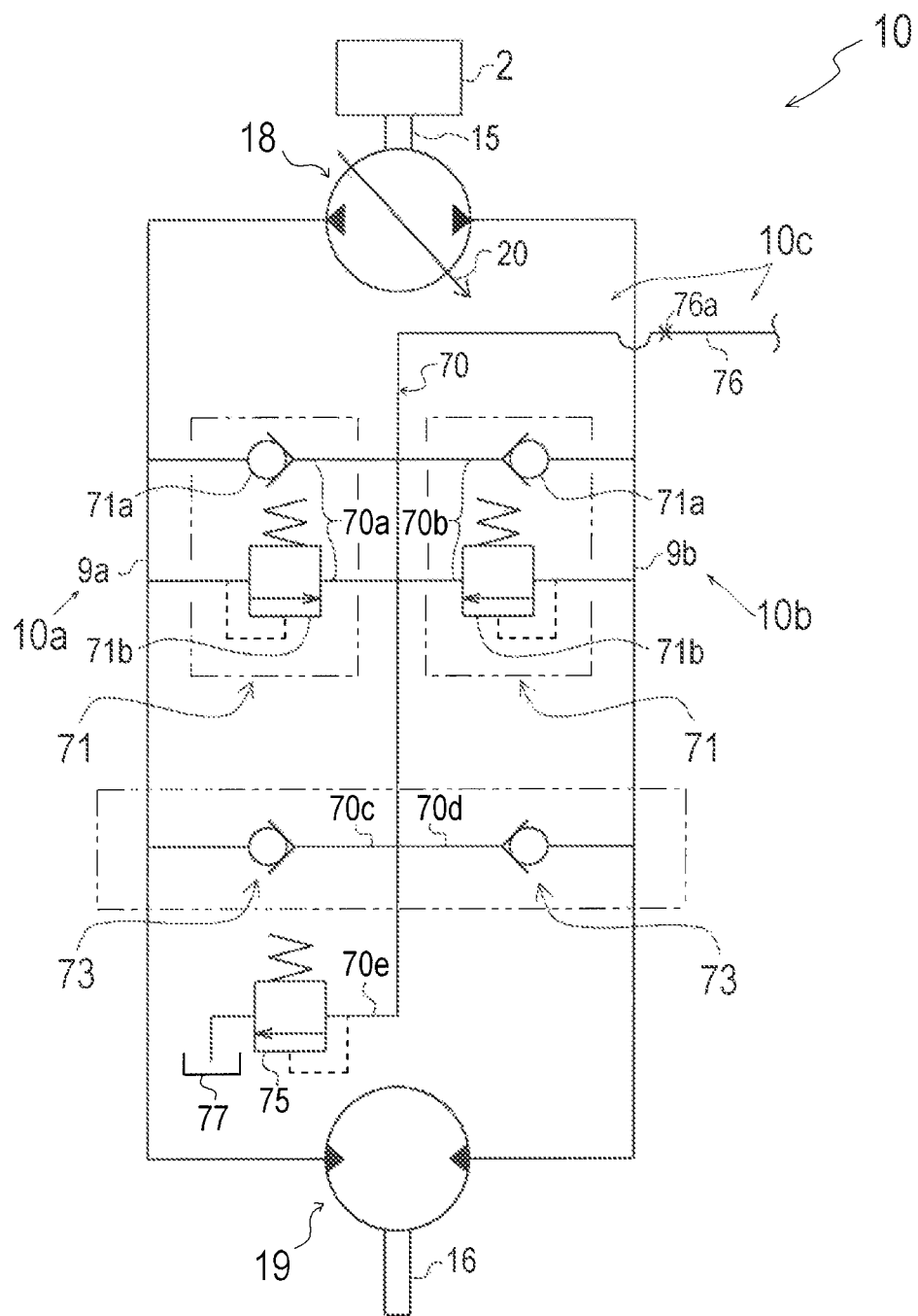
FIG. 5 a hydraulic circuit diagram of HST 10.

The structure of charge check and relief valve assembly 71 will be detailed with reference to FIG. 4. Each charge check and relief valve assembly 71 includes a check valve member 80, a plug 81, a spring retainer 82, a check valve spring 83, a relief valve spring 85 and a relief valve pin 87. The open end of valve chamber hole 62h on side surface 62e is defined as a distal end of valve chamber hole 62h, and the closed end of valve chamber hole 62h except that it is open to charge and relief port 70a or 70b is defined as a proximal end of valve chamber hole 62h. This proximal end of valve chamber hole 62h is formed as a check valve seat 62i. In this embodiment, charge check and relief valve assembly 71 will be described on the assumption that the axial direction of relief valve pin 87 in the lateral horizontal direction of center section 62 is defined as the axial direction of charge check and relief valve assembly 71.

Check valve member 80 having a relief valve port hole 80a is axially slidably fitted in the proximal end portion of valve chamber hole 62h so as to fluidly connect valve chamber hole 62h to charge and relief port 70a or 70b via relief valve port hole 80a. Plug 81 is fitted into the distal end portion of valve chamber hole 62h and is fixed to center section 62 so as to plug the distal open end of valve chamber hole 62h. Plug 81 has a recess 81a that is proximally open toward charge and relief port 70a or 70b. Relief valve pin 87 is passed through relief valve port hole 80a of check valve member 80 so as to have a proximal end thereof on a proximal side of check valve member 80 toward charge and relief port 70a or 70b and so as to have a distal end thereof in recess 81a. The proximal end of relief valve pin 87 is formed as a head 87a having a diameter that is larger than that of relief valve port hole 80a so as to be prevented from moving to the distal side of check valve member 80 through relief valve port hole 80a.

Spring retainer 82 is screwed and fixed on relief valve pin 87 on the distal side of check valve member 80. The axial position of spring retainer 82 relative to relief valve pin 87 is adjustable depending on the screwing of spring retainer 82 on relief valve pin 87. Spring retainer 82 has a flange whose outer peripheral edge is fitted to the inner peripheral surface of recess 81a except for a later-discussed gap between the outer peripheral edge of the flange of spring retainer 82 and the inner peripheral surface of recess 81a.

Check valve spring 83 is coiled around relief valve pin 87 in recess 81a between the flange of spring retainer 82 and a wall portion of plug 81 defined as a closed distal end of recess 81a so as to bias relief valve pin 87 in the proximal direction toward charge and relief port 70a or 70b. A space of recess 81a between the wall portion of plug 81 and the flange of spring retainer 82 is defined as a check valve spring chamber 84 incorporating check valve spring 83.

Relief valve spring 85 has a larger spring force than that of check valve spring 83. Relief valve spring 85 is coiled around relief valve pin 87 between the flange of spring retainer 82 and check valve member 80 across corresponding main fluid hole 9a or 9b so as to bias relief valve pin 87 in the distal direction toward plug 81. A space of valve chamber hole 62h crossing main fluid hole 9a or 9b between the flange of spring retainer 82 and check valve member 80 is defined as a relief valve spring chamber 86 incorporating relief valve spring 85. Check valve spring chamber 84 and relief valve spring chamber 86 are fluidly connected to each other via the above-mentioned gap between the outer peripheral edge of the flange of spring retainer 82 and the inner peripheral surface of recess 81a, thereby allowing fluid to flow between chambers 84 and 86 so as to allow compression and expansion of springs 83 and 85.

Check valve member 80 has an unshown slit on an outer peripheral portion thereof. When check valve member 80 is fitted to check valve seat 62i, the unshown slit is closed to isolate relief valve spring chamber 86 from corresponding charge and relief port 70a or 70b. When check valve member 80 moves toward plug 81 and is separated from check valve seat 62i, the unshown slit of check valve member 80 is opened to fluidly connect corresponding charge and relief port 70a or 70b to relief valve spring chamber 86.

Check valve member 80, spring retainer 82, relief valve spring 85 and relief valve pin 87 are assembled as a main valve unit 88 in which all of these members are axially slidable together while keeping head 87a of relief valve pin 87 fitted on check valve member 80 to close relief valve port hole 80a. This is defined as an integral slide condition of main valve unit 88 caused by compressing of check valve spring 83.

In the initial condition of charge check and relief valve assembly 71, check valve member 80 biased by check valve spring 83 is fitted to check valve seat 62i so as to shut the unshown slit of check valve member 80 from corresponding charge and relief port 70a or 70b. Further, head 87a of relief valve pin 87 biased by relief valve spring 85 is fitted to check valve member 80 to close relief valve port hole 80a, thereby shutting relief valve spring chamber 86 and corresponding main fluid hole 9a or 9b from charge fluid hole 70.

When corresponding main fluid hole 9a or 9b is hydraulically depressed so that the hydraulic pressure therein becomes less than the hydraulic pressure in charge fluid hole 70, the higher hydraulic pressure of charge and relief port 70a or 70b than that of relief valve spring chamber 86 moves check valve member 80 and relief valve pin 87 in the distal direction toward plug 81 against check valve spring 83 so that main valve unit 88 in the integral slide condition moves in the distal direction to compress check valve spring 83. Accordingly, check valve member 80 is separated from check valve seat 62i so as to open the unshown slit of check valve member 80 to allow flow of fluid from corresponding charge and relief port 70a or 70b to relief valve spring chamber 86. This is the charge check valve function of charge check and relief valve assembly 71. In this state, as mentioned above, main valve unit 88 is kept in the integral slide condition so as to close relief valve port hole 80a. Therefore, corresponding charge and relief port 70a or 70b serves as a charge port to supply fluid to relief valve spring chamber 86 via the slit of check valve member 80.

On the contrary, in the initial condition of charge check and relief valve assembly 71, when corresponding main fluid hole 9a or 9b is loaded with an excessively high hydraulic pressure, the increased hydraulic pressure of relief valve spring chamber 86 than that of charge and relief port 70a or 70b thrusts head 87a of relief valve pin 87 in the proximal direction while check valve member 80 is held abutting against check valve seat 62i, thereby closing the unshown slot of check valve member 80 and thereby separating head 87a of relief valve pin 87 from check valve member 80 so as to open relief valve port hole 80a to release fluid from corresponding main fluid hole 9a or 9b and relief valve spring chamber 86 to charge fluid hole 70. This is the relief valve function of charge check and relief valve assembly 71. In this state, corresponding charge and relief port 70a or 70b serves as a relief port to release excessive fluid from corresponding main fluid hole 9a or 9b to charge fluid hole 70.

When the hydraulic pressure in charge fluid hole 70 is increased by the relief valve function of charge check and relief valve assembly 71, the excessively hydraulic pressurized fluid can be drained from charge fluid hole 70 to the fluid sump in HST housing 61 via drain port 70e. In this regard, as shown in FIG. 2, a pressure regulation valve 75 is fitted into drain port 70e so as to control the fluid flow from drain port 70e to the fluid sump in HST housing 61, thereby regulating the hydraulic pressure in charge fluid hole 70, i.e., the hydraulic pressure of charge fluid passage 10c extended from the deliver port of charge pump 8.

The structure of charge check valves 73 will be detailed with reference to FIG. 3. As mentioned above, charge check valves 73 are provided in respective bottom valve chambers 9a1 and 9b1 at the bottom end portions of main fluid holes 9a and 9b. Each charge check valve 73 includes a plug 89 that is fitted into each bottom valve chamber 9a1 or 9b1 so as to close the opening of bottom valve chamber 9a1 or 9b1. Plug 89 is formed therein with a vertical axial port 89a. Vertical axial port 89a has a closed bottom end thereof and has an open top end 89a1 on a top of plug 89. An annular port 89a3 is formed on an outer peripheral surface of plug 89 to be joined to corresponding charge port 70c or 70d, and horizontal radial ports 89a2 are formed in plug 89 between annular port 89a3 and vertical axial port 89a so as to fluidly connect corresponding charge port 70c or 70d to vertical axial port 89a.

In each of main fluid holes 9a and 9b, charge check valve 73 includes a ball 90, a cover 91 and a spring 92 that are disposed above the top of plug 89. Cover 91 is fitted at a bottom opening thereof onto the top of plug 89. Cover 91 has a valve port hole 91a on a top thereof. Therefore, top end 89a1 of vertical axial port 89a in plug 89 is open to the inner space in cover 91, and the inner space in cover 91 is open to corresponding main fluid hole 9a or 9b via valve port hole 91a. Ball 90 is disposed in cover 91, and spring 92 is disposed in cover 91 between the top of cover 91 and ball 90 so as to bias ball 90 downward to close top end 89a1 of vertical axial port 89a.

In the initial condition of charge check valve 73, ball 90 is fitted on the top of plug 89 so as to close top end 89a1 of vertical axial port 89a, thereby shutting corresponding main fluid hole 9a or 9b (main fluid passage 10a or 10b) from charge fluid hole 70 (charge fluid passage 10c). When corresponding main fluid hole 9a or 9b is hydraulically depressed relative to charge fluid hole 70, ball 90 is moved upward by the differential hydraulic pressure between vertical axial port 89a and the inner space of cover 91 in the condition that vertical axial port 89a is fluidly connected to charge fluid hole 70 via ports 89a2 and 89a3 and the inner space of cover 91 is fluidly connected to main fluid hole 9a or 9b via valve port hole 91a, thereby opening top end 89a1 of vertical axial port 89a so as to allow fluid to flow from higher hydraulically pressurized charge fluid hole 70 to corresponding main fluid hole 9a or 9b.

In this way, HST 10 is advantageous in that each main fluid passage 10a or 10b when hydraulically depressed relative to charge fluid passage 10c is sufficiently and efficiently supplied with fluid by two charge check valves, i.e., both charge check and relief valve assembly 71 and charge check valve 73. Further, HST 10 is advantageous in reducing the number of parts for arranging additional external charge cheek valves because center section 62 incorporates all of these valves and valve assemblies having the charge check valve function, thereby being compacted and reducing costs.

As mentioned above, center section 62 of HST 10 has upper left and right valve chamber holes 62h for fitting charge check and relief valve assemblies 71 and has lower left and right bottom valve chambers 9a1 and 9b1 of main fluid holes 9a and 9b for fitting charge check valves 73. In other words, each of charge check and relief valve assemblies 71 arranged across respective main fluid holes 9a and 9b is defined as a charge check valve having both the charge check valve function and the relief valve function, and each of charge check valves 73 arranged coaxially to respective main fluid holes 9a and 9b is defined as a charge check valve having only the charge check valve function. Alternatively, each of the charge check valves arranged across respective main fluid holes 9a and 9b may have only the charge check valve function, and/or each of the charge check valves arranged coaxially to respective main fluid holes 9a and 9b may have both the charge check valve function and the relief valve function. In this regard, each of later-discussed charge check valves 74 is defined as a charge check valve having only the charge check valve function and arranged across corresponding main fluid hole 9a or 9b (or later-discussed main fluid hole 102a, 102b, 105a or 105b).

In other words, the type or structure of valves or valve assemblies is not significant. The significant matter for the above-mentioned embodiment and the following embodiments is how to increase the number of charge check valves to sufficiently compensate for fluid leak of main fluid passages 10a and 10b loaded with high hydraulic pressure, more specifically, how to obtain positions in or around center section 62 for ensuring the increased number of charge check valves. From this viewpoint, charge check and relief valve assembly 71 having both the charge check valve function and the relief valve function is advantageous for ensuring compactness of HST 10 because HST 10 having charge check and relief valve assemblies 71 needs spaces for ensuring the increase of number of charge check valves, however, needs no space for arranging additional relief valves.

Alternative HSTs 10A, 10B and 10C will be described with reference to FIGS. 6 to 12 on the assumption that the same reference numbers as those used in the preceding embodiment are used to designate the members and portions that are integral with those designated by the same reference numerals in the preceding embodiment or that function similarly to those designated by the same reference numerals in the preceding embodiment.

Figure 6:
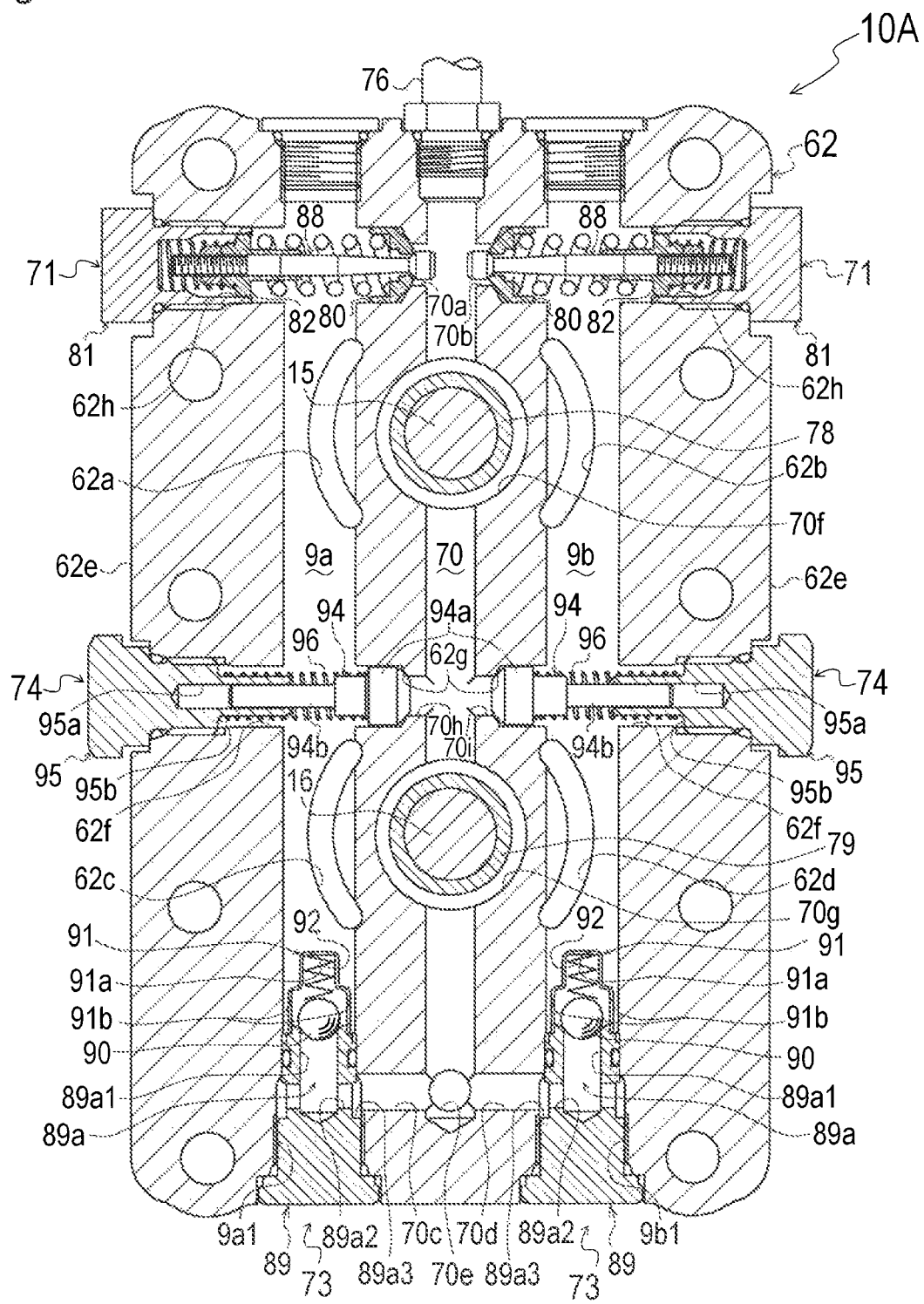
FIG. 6 is a sectional rear view of an HST 10A.
Figure 7:
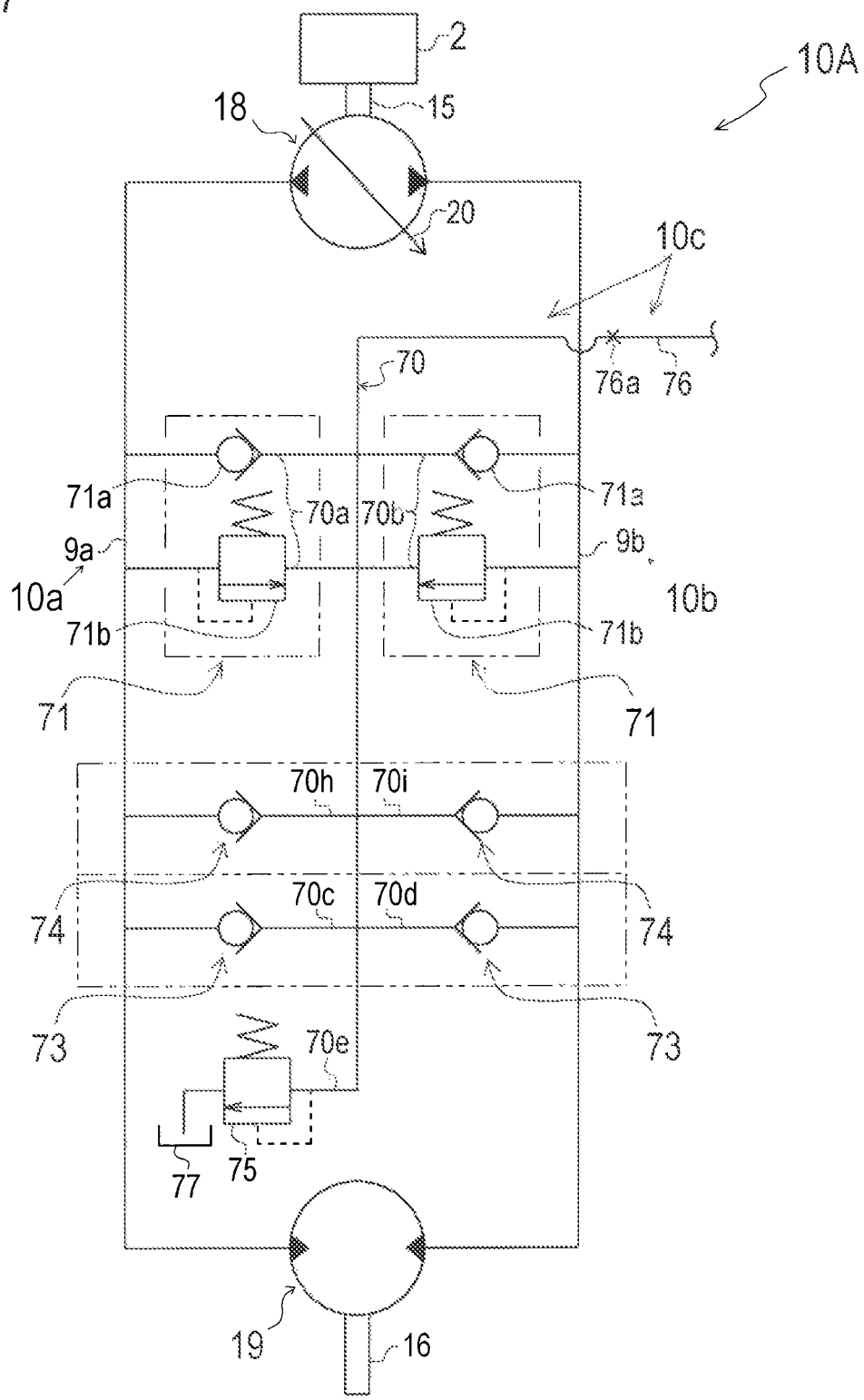
FIG. 7 is a hydraulic circuit diagram of HST 10A.

HST 10A shown in FIGS. 6 and 7 will be described. Center section 62 of HST 10A incorporates charge check and relief valve assemblies 71 in upper valve chamber holes 62h and incorporates charge check valves 73 in bottom valve chambers 9a1 and 9b1 of main fluid holes 9a and 9b, similar to center section 62 of HST 10. Further, center section 62 of HST 10A incorporates additional charge check valves 74 so as to increase the number of valves or valve assemblies having the charge check valve function, thereby enhancing the efficiency of charge check valve function to supply fluid to main fluid passages 10a and 10b while keeping the compactness of center section 62.

In center section 62 of HST 10A, left and right charge ports 70h and 70i branch to respective left and right main fluid holes 9a and 9b leftward and rightward from a vertically middle portion of charge fluid hole 70 below upper valve chamber holes 62h and above bottom valve chambers 9a1 and 9b1 of main fluid holes 9a and 9b (below pump shaft 15 and above motor shaft 16). Left and right middle valve chamber holes 62f are formed in the vertical middle portion of center section 62 so as to be open on vertical left and right outer side surfaces 62e of center section 62, so as to cross the respective upper portions of main fluid holes 9a and 9b and so as to be connected coaxially to respective charge ports 70h and 70i. Left and right charge check valves 74 are fitted from left and right side surfaces 62e of center section 62 into respective valve chamber holes 62f so as to be interposed between respective charge ports 70h and 70i and respective main fluid holes 9a and 9b, thereby supplying fluid from charge fluid hole 70 to hydraulically depressed main fluid hole 9a or 9b. In other words, HST 10A is advantageous in that three valves and valve assembly 77, 73 and 74 function as the charge check valves to supply fluid to hydraulically depressed main fluid hole 9a or 9b.

The structure of charge check valves 74 will be detailed with reference to FIG. 6 on the assumption that the proximal and distal sides and the axial direction of valve chamber hole 62f and charge check valve 74 are defined similar to those of valve chamber hole 62h and charge check and relief valve assembly 71. The proximal end portions of valve chamber holes 62f have respective openings joined to respective charge ports 70h and 70i, and have respective edges surrounding the openings so as to serve as valve seats 62g. Each charge check valve 74 includes a valve member 94, a plug 95 and a spring 96. Valve member 94 is formed as a rod 94b extended from a distal end thereof and is formed at a proximal end thereof with a head 94a diametrically larger than rod 94b. Plug 95 is fitted into the distal end portion of valve chamber hole 62f so as to plug the distal opening of valve chamber hole 62f on vertical side surface 62e. Plug 95 is axially formed therein with a proximally open recess 95a. Rod 94b of valve member 94 is axially slidably fitted into recess 95a of plug 95. Plug 95 is formed with a step whose vertical surface serves as a spring retainer 95b. Spring 96 is coiled around rod 94b of valve member 94 between head 94a of valve member 94 and spring retainer 95b of plug 95 so as to bias valve member 94 in the proximally axial direction.

In the initial condition of HST 10A or when corresponding main fluid hole 9a or 9b has a sufficiently hydraulic pressure, head 94a of valve member 94 is pressed against valve seat 62g by the hydraulic pressure in corresponding main fluid hole 9a or 9b and valve chamber hole 62f so as to close the opening at the proximal end of valve chamber hole 62f joined to corresponding charge port 70h or 70i, thereby fluidly isolating corresponding main fluid hole 9a or 9b from charge fluid hole 70. When corresponding main fluid hole 9a or 9b is hydraulically depressed to have a hydraulic pressure less than charge fluid hole 70, the higher hydraulic pressure in charge port 70h or 70i presses head 94a of valve member 94 in the distally axial direction so as to separate head 94a of valve member 94 from valve seat 62g, thereby opening valve chamber hole 62f to corresponding charge port 70h or 70i so as to allow fluid to flow from charge fluid hole 70 to corresponding main fluid hole 9a or 9b.

HST 10B shown in FIGS. 8 to 10 and HST 10C shown in FIGS. 11 and 12 will be described. Each of HSTs 10B and 10C is defined as having a center section 93 to which at least one attachable charge check valve enlargement unit incorporating two charge check valves 74 is joined. HSTs 10B and 10C are advantageous to shorten fluid passage bores in center section 93 and to enhance variation of the number of charge check valves by adjusting the number of attachable check valve enlargement units attached to center section 93. In this regard, HST 10B is defined as having only a charge check valve enlargement unit 97 attached to center section 93, and HST 10C is defined as having two charge check valve enlargement units 97 and 97A joined to center section 93. Alternatively, more than two charge check valve enlargement units may be joined to center section 93 so as to constitute an HST. More specifically, any HST having center section 93 needs charge check valve enlargement unit 97 as at least one charge check valve enlargement unit attached to center section 93, and may be optionally provided between center section 93 and charge check valve enlargement unit 97 with one or more additional charge check valve enlargement units 97A.

On the assumption that each of HST 10B and 10C is arranged to have upper and lower aligned hydraulic pump 18 and hydraulic motor 19 mounted on center section 93 similar to those mounted on center section 62 of HST 10 or 10A, center section 93 is formed therein with left and right vertical main fluid holes 9a and 9b serving as main fluid passages 10a and 10b similar to those in center section 62 of HST 10 or 10A. Bottom end portions of main fluid holes 9a and 9b are not shown in FIGS. 9 and 11, however, they are not formed as bottom valve chambers 9a1 and 9b1 for accommodating charge check valves 73. In this regard, a vertical charge fluid hole 100 is formed in center section 93 between main fluid holes 9a and 9b similar to the upper portion of charge fluid hole 70 in center section 62, however, the bottom end of charge fluid hole 100 is disposed above pump shaft 15 because charge fluid hole 100 does not have to extend downward across pump shaft 15 and motor shaft 16 to supply fluid to charge check valves in the bottom end portions of main fluid holes 9a and 9b. A drain port 100d for draining fluid from charge fluid hole 100 to the fluid sump in HST housing 61 is formed in center section 93 to extend forward from a portion of charge fluid hole 100 immediately above the bottom end charge fluid hole 100, and is provided with pressure regulation valve 75.

Similar to charge and relief ports 70a and 70b in center section 62 of HST 10 or 10A, left and right charge and relief ports 100b and 100c are formed in center section 93 so as to branch leftward and rightward from the bottom end of charge fluid hole 100. Similar to left and right valve chamber holes 62h in center section 62, left and right valve chamber holes 93d are formed in center section 93 to extend leftward and rightward from respective charge and relief ports 100b and 100c to left and right vertical outer side surfaces of center section 93. Similar to charge check and relief valve assemblies 71 in valve chamber holes 62h, left and right charge check and relief valve assemblies 71 are provided in respective valve chamber holes 93d so as to be interposed between respective charge and relief ports 100b and 100c and respective main fluid holes 9a and 9b. In this way, in center section 93, only charge check and relief valve assemblies 71 have the charge check valve function.

Center section 93 has a horizontal flat top surface 93a. Charge fluid hole 100 and main fluid holes 9a and 9b have respective top ends 100a, 9a2 and 9b2 upwardly open on top surface 93a of center section 93 so as to be fluidly connected to respective fluid holes 101, 102a and 102b formed in a block 98 of charge check valve enlargement unit 97 or so as to be fluidly connected to respective fluid holes 104, 105a and 105b formed in a block 103 of charge check valve enlargement unit 97A as discussed later, thereby constituting charge fluid passage 10c and main fluid passages 10a and 10b. Further, a top edge portion of center section 93 having horizontal flat top surface 93a is expanded forward and rearward so as to have bolt holes 93b into which later-discussed bolts 99 or 99A are screwed.

Figure 8:
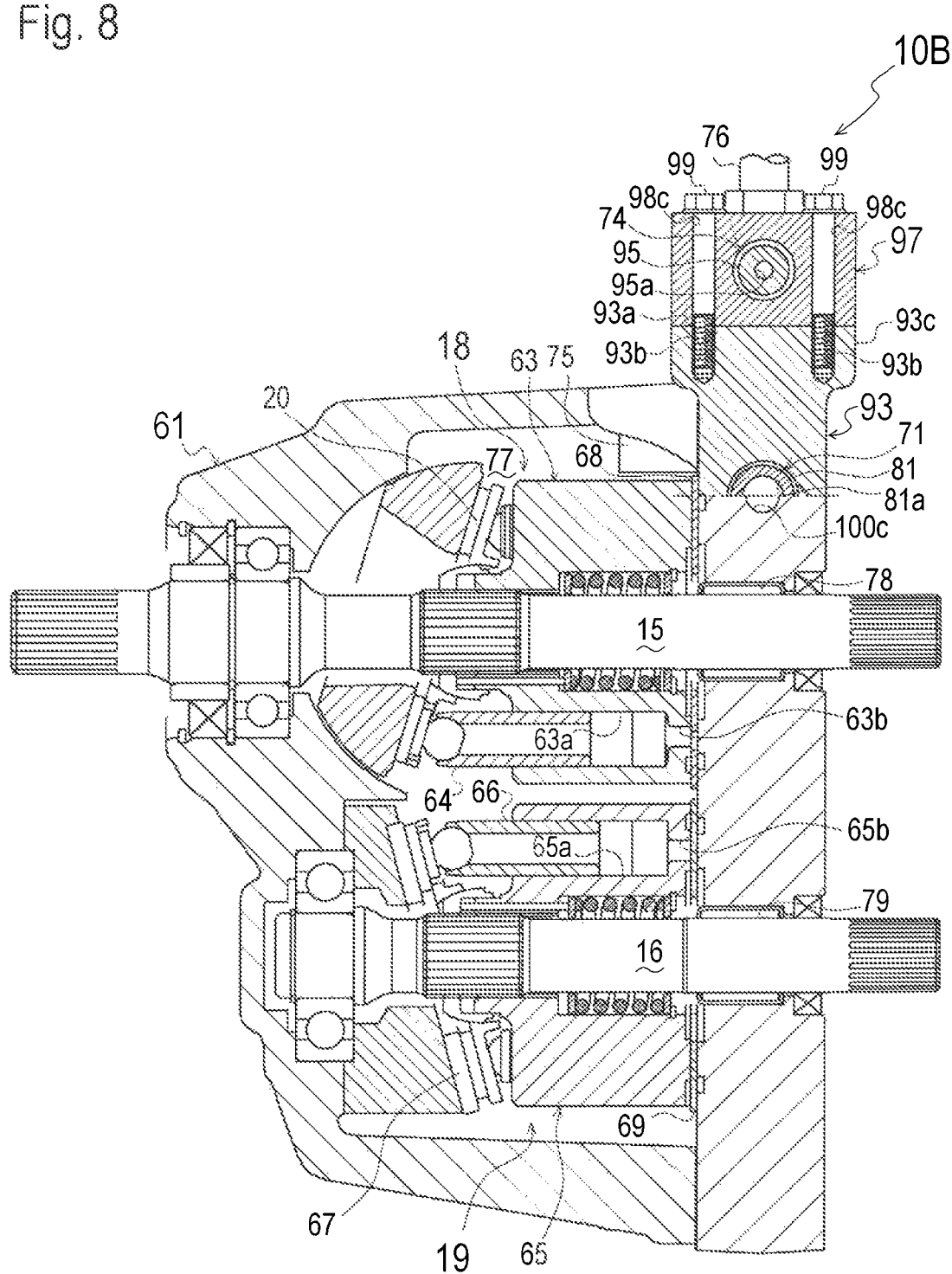
FIG. 8 is a sectional side view of an HST 10B.
Figure 9:
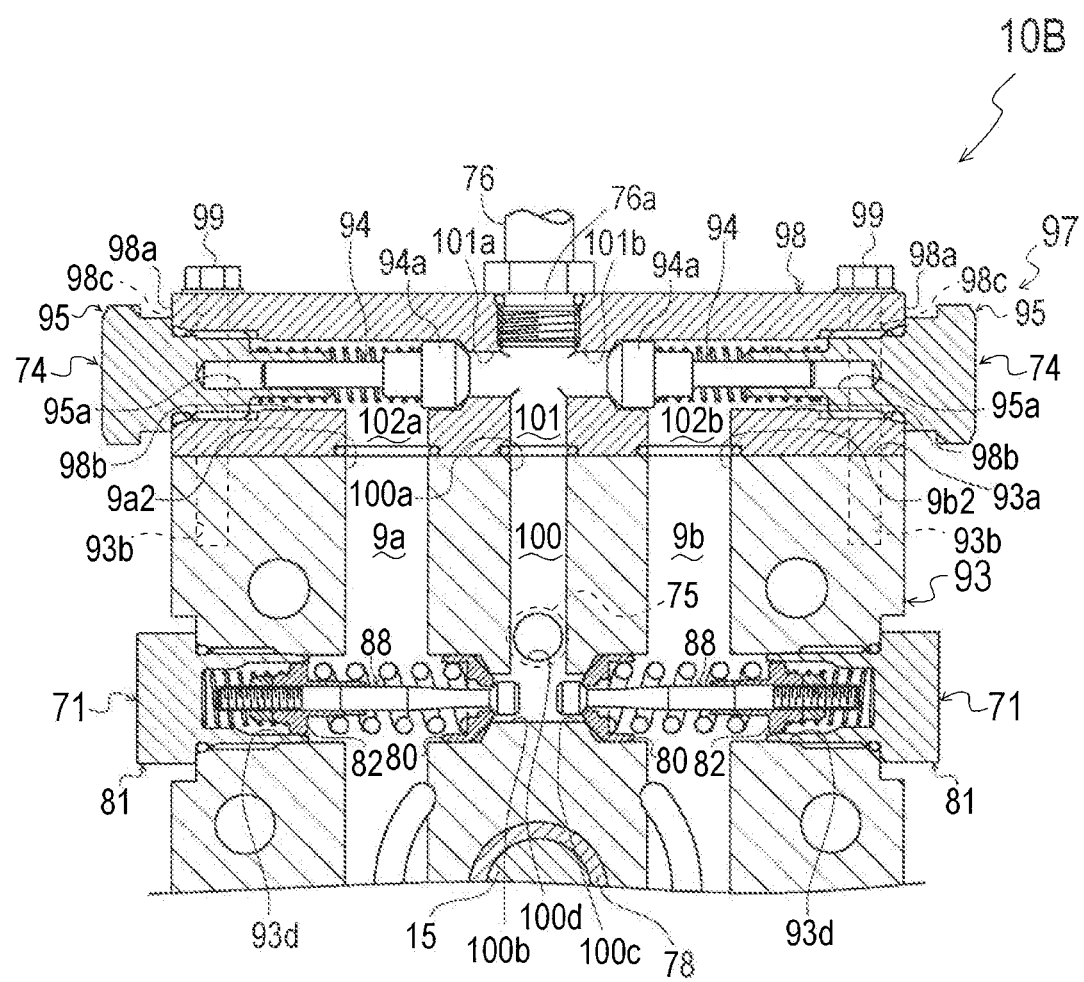
FIG. 9 is a sectional rear view of HST 10B.
Figure 10:
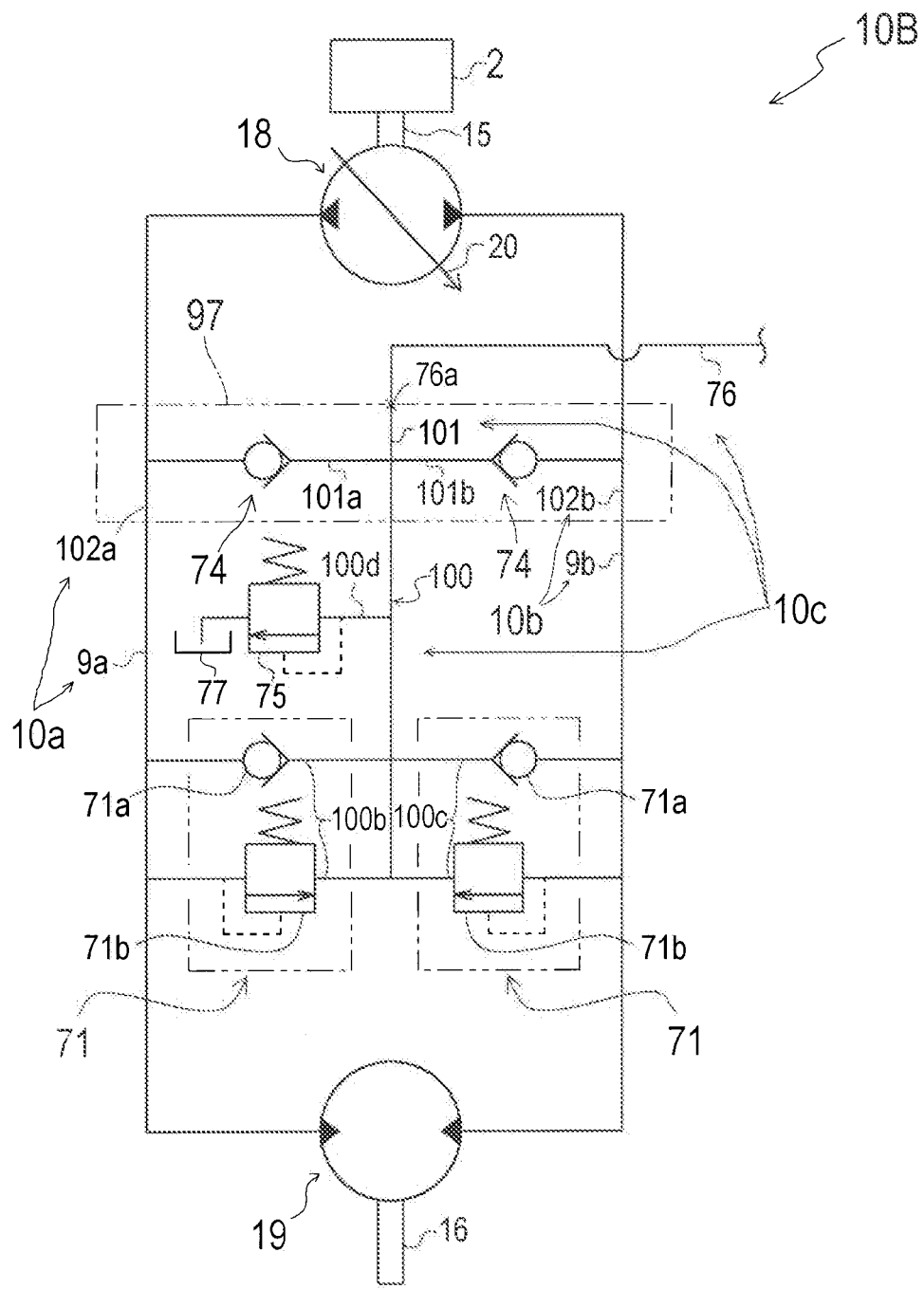
FIG. 10 is a hydraulic circuit diagram of HST 10B.

Referring to HST 10B shown in FIGS. 8 to 10, charge check valve enlargement unit 97 includes rectangular block 98 in which two charge check valves 74 are installed. Block 98 is formed therein with a vertical charge fluid hole 101 extended between top and bottom surfaces of block 98. The bottom end of charge fluid hole 101 open on the bottom surface of block 98 corresponds to open top end 100a of charge fluid hole 100 in center section 93 or an open top end of charge fluid hole 104 in later-discussed charge check valve enlargement unit 97A. Similar to pipe joint 76a fitted in the top portion of charge fluid hole 70 of center section 62, pipe joint 76a is fitted into the top portion of vertical charge fluid hole 101 open on the top surface of block 98, and pipe 76 is extended from pipe joint 76a to the delivery port of charge pump 8. Left and right charge ports 101a and 101b are formed in block 98 so as to branch leftward and rightward from a vertically intermediate portion of charge fluid hole 101. Block 98 has left and right vertical outer side surfaces 98a. Left and right valve chamber holes 98b are formed in block 98 between respective left and right side surfaces 98a and respective left and right charge ports 101a and 101b. Left and right charge check valves 74 are provided in respective valve chamber holes 98b similar to charge check valves 74 in valve chamber holes 62f in center section 62 of HST 10A.

Left and right vertical main fluid holes 102a and 102b are extended downward from laterally intermediate portions of respective valve chamber holes 98b so that charge check valves 74 are interposed between respective charge ports 101a and 101b and respective main fluid holes 102a and 102b. In other words, charge check valves 74 are disposed across top ends of main fluid holes 102a and 102b, and the top surface of block 98 covers charge check valves 74 and the top ends of main fluid holes 102a and 102b. The bottom surface of block 98 is horizontally flat so as to correspond to horizontal flat top surface 93a of center section 93, and bottom ends of main fluid holes 102a and 102b are open at the bottom surface of block 98 so as to correspond to open top ends 9a2 and 9b2 of main fluid holes 9a and 9b.

Block 98 is expanded forward and rearward from charge check valves 74 therein so as to ensure vertical bolt holes 98c corresponding to bolt holes 93b. When charge check valve enlargement unit 97 is mounted on center section 93, the bottom surface of block 98 is fitted on top surface 93a of center section 93 so as to coincide the bottom ends of holes 101, 102a and 102b in block 98 to top ends 100a, 9a2 and 9b2 of holes 100, 9a and 9b in center section 93, and bolts 99 are screwed downward into respective bolt holes 93b via respective bolt holes 98c so as to fasten block 98 to center section 93, thereby completing attachment of charge check valve enlargement unit 97 to center section 93. Therefore, center section 93 incorporates only valve assemblies 71, however, charge check valve enlargement unit 97 is attached to center section 93 so that HST 10B has four valves, i.e., two charge check and relief valve assemblies 71 and two charge check valves 74, functioning as the charge check valves for supplying fluid from charge fluid passage 10c to respective main fluid passages 10a and 10b.

Figure 11:
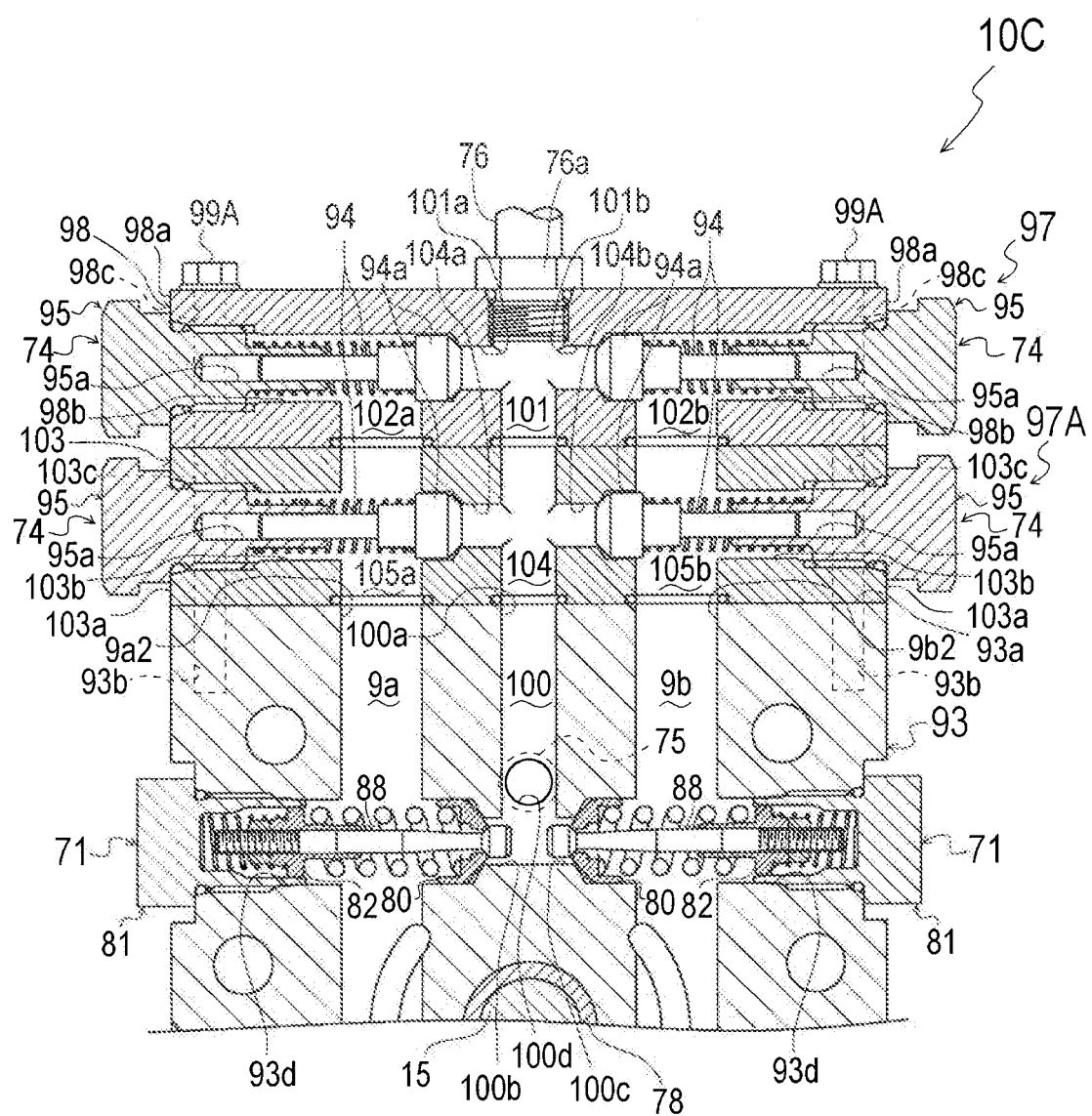
FIG. 11 is a sectional rear view of an HST 10C.
Figure 12:
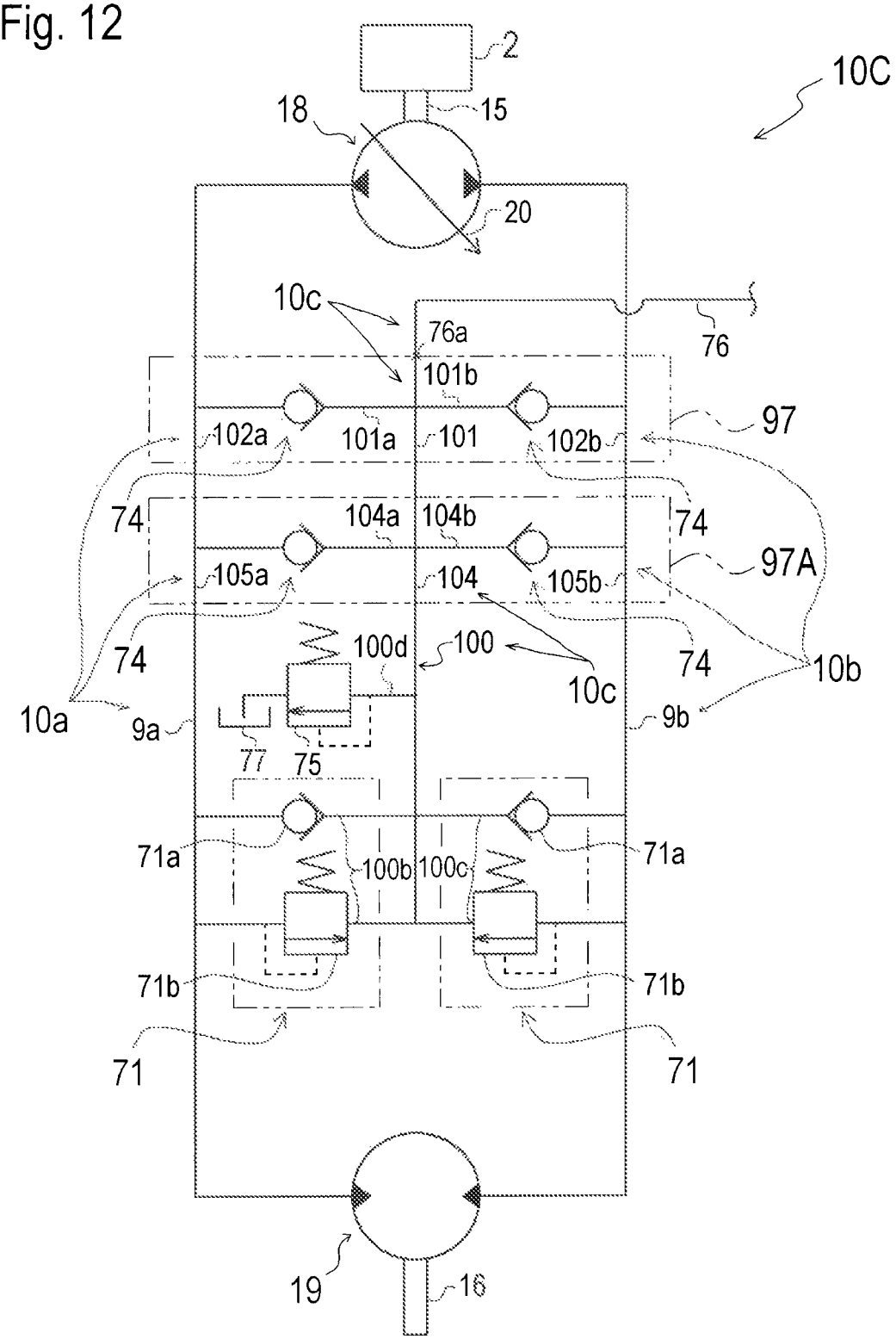
FIG. 12 is a hydraulic circuit diagram of HST 10C.

Referring to HST 10C shown in FIGS. 11 and 12, charge check valve enlargement unit 97A includes rectangular block 103 in which two charge check valves 74 are installed. Block 103 is formed therein with a vertical charge fluid hole 104 between top and bottom surfaces of block 103. The bottom end of charge fluid hole 104 open on the bottom surface of block 103 corresponds to open top end 100a of charge fluid hole 100 in center section 93 or an open top end of fluid hole 104 in block 103 of another charge check valve enlargement unit 97A. The top end of charge fluid hole 104 open on the top surface of block 103 corresponds to the bottom end of charge fluid hole 101 in block 98 of charge check valve enlargement unit 97 or the bottom end of charge fluid hole 104 in block 103 of another charge check valve enlargement unit 97A. Left and right charge ports 104a and 104b are formed in block 103 so as to branch leftward and rightward from a vertically intermediate portion of charge fluid hole 104. Block 103 has left and right vertical outer side surfaces 103a. Left and right valve chamber holes 103b are formed in block 103 between respective left and right side surfaces 103a and respective left and right charge ports 104a and 104b. Left and right charge valves 74 are provided in respective valve chamber holes 103b similar to charge check valves 74 in valve chamber holes 62f in center section 62 of HST 10A.

Left and right vertical main fluid holes 105a and 105b are formed in block 103 so as to extend between the top and bottom surfaces of block 103 across laterally intermediate portions of respective valve chamber holes 103b so that charge valves 74 are interposed between respective charge ports 104a and 104b and respective main fluid holes 105a and 105b. In other words, charge check valves 74 are disposed at the vertically intermediate portions of main fluid holes 105a and 105b. The top surface of block 103 is horizontally flat so as to correspond to the horizontal flat bottom surface of block 98, and top ends of main fluid holes 105a and 105b are open at the top surface of block 103 so as to correspond to the open bottom ends of main fluid holes 102a and 102b. The bottom surface of block 103 is horizontally flat so as to correspond to horizontal flat top surface 93a of center section 93, and bottom ends of main fluid holes 105a and 105b are open at the bottom surface of block 103 so as to correspond to open top ends 9a2 and 9b2 of main fluid holes 9a and 9b. Further, if two charge check valve enlargement units 97A are provided, the horizontally flat top surface of one block 103 corresponds to the horizontally flat bottom surface of another block 103.

Block 103 is expanded forward and rearward from charge check valves 74 therein so as to ensure vertical bolt holes 103c corresponding to bolt holes 93b and 98c. When charge check valve enlargement units 97 and 97A are mounted on center section 93, the bottom surface of block 103 of charge check valve enlargement unit 97A is fitted on top surface 93a of center section 93 so as to coincide the bottom ends of fluid holes 104, 105a and 105b in unit block 103 to top ends 100a, 9a2 and 9b2 of holes 100, 9a and 9b in center section 93, and the bottom surface of block 98 of charge check valve enlargement unit 97 is fitted on the top surface of block 103 of charge check valve enlargement unit 97A so as to coincide the bottom ends of holes 101, 102a and 102b in block 98 to top ends of fluid holes 104, 105a and 105b in block 103. Then, bolts 99A are screwed downward into respective bolt holes 93b via respective bolt holes 98c and 103c so as to fasten blocks 98 and 103 to center section 93, thereby completing attachment of charge check valve enlargement units 97 and 97A to center section 93. Therefore, while center section 93 incorporates only valve assemblies 71, charge check valve enlargement units 97 and 97A are attached to center section 93 so that HST 10C has six valves, i.e., two charge check and relief valve assemblies 71 and four charge check valves 74, functioning as the charge check valves for supplying fluid from charge fluid passage 10c to respective main fluid passages 10a and 10b.

The HST having center section 93 and charge check valve enlargement unit 97 can easily increase charge check valves 74 in number more than those of HST 10C by increasing the number of charge check valve enlargement units 97A interposed between center section 93 and charge check valve enlargement unit 97, thereby further increasing the total sectional area of charge check valves (charge ports) for supplying fluid to each of main fluid passages 10a and 10b. On the contrary, the HST 10C having four charge check valves 74 can be easily changed to HST 10B having two charge check valves 74 only by removing charge check valve enlargement unit 97A and by directly joining charge check valve enlargement unit 97 to center section 93.

Adaptation and effects of the present invention to HSTs 10, 10A, 10B and 10C serving as embodiments of the invention will be explained. As mentioned above, each of HSTs 10, 10A, 10B and 10C includes hydraulic pump 18, hydraulic motor 19, first and second main fluid passages 10a and 10b fluidly connecting hydraulic pump 18 to hydraulic motor 19 so as to constitute a closed fluid circuit, charge fluid passage 10c, a plurality of first charge check valves and a plurality of second charge check valves.

The plurality of first charge check valves are interposed between charge fluid passage 10c and first main fluid passage 10a so as to allow fluid to flow from charge fluid passage 10c to first main fluid passage 10a when first main fluid passage 10a is hydraulically depressed relative to charge fluid passage 10c. In this regard, HST 10 includes two first charge check valves, i.e., charge check and relief valve assembly 71 and charge check valve 73 interposed between charge fluid hole 70 and main fluid hole 9a. HST 10A includes three first charge check valves, i.e., charge check and relief valve assembly 71 and charge check valves 73 and 74 interposed between charge fluid hole 70 and main fluid hole 9a. HST 10B includes two first charge check valves, charge check and relief valve assembly 71 and charge check valve 74 interposed between charge fluid holes 100 and 101 and main fluid holes 9a and 102a. HST 10C includes three first charge check valves, i.e., charge check and relief valve assembly 71 and two charge check valves 74 interposed between charge fluid holes 100 and 101 and main fluid holes 9a, 102a and 105a.

The plurality of second charge check valves are interposed between charge fluid passage 10c and second main fluid passage 10b so as to allow fluid to flow from charge fluid passage 10c to second main fluid passage 10b when second main fluid passage 10b is hydraulically depressed relative to charge fluid passage 10c. In this regard, HST 10 includes two second charge check valves, i.e., charge check and relief valve assembly 71 and charge check valve 73 interposed between charge fluid hole 70 and main fluid hole 9b. HST 10A includes three second charge check valves, i.e., charge check and relief valve assembly 71 and charge check valves 73 and 74 interposed between charge fluid hole 70 and main fluid hole 9b. HST 10B includes two second charge check valves, i.e., charge check and relief valve assembly 71 and charge check valve 74 interposed between charge fluid holes 100 and 101 and main fluid holes 9b and 102b. HST 10C includes three second charge check valves, i.e., charge check and relief valve assembly 71 and two charge check valves 74 interposed between charge fluid holes 100 and 101 and main fluid holes 9b, 102b and 105b.

Therefore, each of HSTs 10, 10A, 10B and 10C is advantageous in that the increase of number of charge check valves increases the total sectional area of fluid passages (ports) between the respective first and second charge check valves and respective first and second main fluid passages 10a and 10b, thereby increasing flow of fluid charged into first and second main fluid passages 10a and 10b. Therefore, each of HSTs 10, 10A, 10B and 10C can properly act even if it is subjected to a great hydraulic pressure in such a case where it is used in HMT 12.

Each of HSTs 10, 10A, 10B and 10C includes center section 62 or 93 onto which hydraulic pump 18 and hydraulic motor 19 are mounted. Each of center sections 62 and 93 is formed therein with holes 9a and 9b serving as first and second main fluid passages 10a and 10b and with hole 70 or 100 serving as charge fluid passage 10c. One charge check and relief valve assembly 71, one charge check valve 73 or one charge check valve 74 serve as at least one first charge check valve provided in center section 62 or 93 so as to be interposed between hole 70 or 100 and hole 9a. Another charge check and relief valve assembly 71, another charge check valve 73 or another charge check valve 74 serve as at least one second charge check valve provided in center section 62 or 93 so as to be interposed between hole 70 or 100 and hole 9b. Therefore, the number of charge check valves disposed outside of center section 62 or 93 is reduced so as to ensure the compactness of HST 10, 10A, 10B or 10C.

In each of center sections 62 and 93, hole 70 or 100 serving as charge fluid passage 10c is disposed between hole 9a serving as first main fluid passage 10a and hole 9b serving as second main fluid passage 10b. First charge port 70a or 100b is formed in center section 62 or 93 so as to extend from hole 70 or 100 to charge check and relief valve assembly 71 serving as the at least one first charge check valve. Second charge port 70b or 100c is formed in center section 62 or 93 so as to extend opposite to first charge port 70a or 100b from hole 70 or 100 to charge check and relief valve assembly 71 serving as the at least one second charge check valve. Therefore, hole 70 or 100 serving as charge fluid passage 10c approaches holes 9a and 9b serving as first and second main fluid passages 10a and 10b so as to reduce the lengths of first and second charge ports 70a and 70h or 100b and 100c, thereby ensuring the compactness of center section 62 or 93 and reducing costs for making fluid holes and ports.

With regard to each of HSTs 10 and 10A, center section 62 has the outer bottom surface at which bottom valve chambers 9a1 and 9b1 are open to serve as open ends of respective holes 9a and 9b serving as first and second main fluid passages 10a and 10b. The pair of charge check valves 73 are fitted into bottom valve chambers 9a1 and 9b1 serving as the open ends of holes 9a and 9b so as to serve as the at least one first charge check valve and the at least one second charge check valve in center section 62. Therefore, no additional hole other than holes 9a and 9b serving as first and second main fluid passages 10a and 10b has to be formed in center section 62 to have the pair of charge check valves 73 serving as the at least one first charge check valve and the at least one second charge check valve, thereby reducing costs.

With regard to each of HSTs 10, 10A, 10B and 10C, the pair of charge check and relief valve assemblies 71 are disposed across respective holes 9a and 9b serving as first and second main fluid passages 10a and 10b so as to serve as the at least one first charge check valve and the at least one second charge check valve in center section 62 and 93. Therefore, each of center sections 62 and 93 has sufficiently large spaces for arranging charge check and relief valve assemblies 71 serving as the first and second charge check valves while reducing lengths of holes 9a and 9b in center section 62 or 93 serving as first and second main fluid passages 10a and 10b. Even if the open bottom ends of holes 9a and 9b serving as bottom valve chambers 9a1 and 9b1 of center section 62 of HST 10 or 10A cannot be used to insert the first and second charge check valves into holes 9a and 9b, other left and right outer surfaces 62e of center section 62 are used to ensure openings of valve chamber holes 62f or 62h for providing the pair of charge check and relief valve assemblies 71 or the pair of charge check valves 74 serving as the at least one first charge check valve and the at least one second charge check valve in center section 62 across respective holes 9a and 9b. Although center section 93 of HST 10B or 10C has no open ends of holes 9a and 9b for convenience of inserting the first and second charge check valves into holes 9a and 9b, other left and right outer surfaces of center section 93 are used to ensure openings of valve chamber holes 93d for providing the pair of charge check and relief valve assemblies 71 serving as the at least one first charge check valve and the at least one second charge check valve in center section 93 across respective holes 9a and 9b. In this way, each of HSTs 10, 10A, 10B and 10C is advantageous in increasing variation of arrangement of the charge check valves in the center section.

With regard to each of HSTs 10B and 10C, charge check valve enlargement unit 97 or 97A is detachably attached to center section 93. Respective holes 101, 102a and 102b or respective holes 104, 105a and 105b serving as first and second main fluid passages 10a and 10b and charge fluid passage 10c are provided in charge check valve enlargement unit 97 or 97A so as to be joined to respective holes 9a and 9b and 100 in center section 93, thereby constituting first and second main fluid passages 10a and 10b and charge fluid passage 10c. One charge check valve 74 is provided in the charge check valve enlargement unit 97 or 97A so as to serve as one of the plurality of first charge check valves interposed between hole 101 or 104 in charge check valve enlargement unit 97 or 97A serving as charge fluid passage 10c and hole 102a or 105a in charge check valve enlargement unit 97 or 97A serving as first main fluid passage 10a. Another charge check valve 74 is provided in charge check valve enlargement unit 97 or 97A so as to serve as one of the plurality of second charge check valves interposed between hole 101 or 104 in charge check valve enlargement unit 97 or 97A serving as charge fluid passage 10c and hole 102b or 105b in charge check valve enlargement unit 97 or 97A serving as second main fluid passage 10b. Therefore, the number of the first and second charge check valves can be easily adjusted by attaching or detaching charge check valve enlargement unit 97 or 97A to and from center section 93, thereby standardizing center section 93.

In joined center section 93 and charge check valve enlargement unit 97 or 97A, joined holes 100 and 101 or 104 serving as charge fluid passage 10c are disposed between joined holes 9a and 102a or 105a serving as first main fluid passage 10a and the joined holes serving as the second main fluid passage. First charge port 101a or 104a is provided in charge check valve enlargement unit 97 or 97A so as to extend from hole 101 or 104 in charge check valve enlargement unit 97 or 97A serving as charge fluid passage 10c to first charge check valve 74 in charge check valve enlargement unit 97 or 97A. Second charge port 101b or 104b is provided in charge check valve enlargement unit 97 or 97A so as to extend opposite to first charge port 101a or 104a from hole 101 or 104 in charge check valve enlargement unit 97 or 97A serving as charge fluid passage 10c to second charge check valve 74 in charge check valve enlargement unit 97 or 97A. Therefore, center section 93 and charge check valve enlargement unit 97 or 97A are configured so that first and second main fluid passages 10a and 10b approach charge fluid passage 10c so as to reduce lengths of first and second charge ports 101a and 101b or 104a and 104b in charge check valve enlargement unit 97 or 97A.

First charge check valve 74 in charge check valve enlargement unit 97 or 97A is disposed across hole 102a or 105a in charge check valve enlargement unit 97 or 97A serving as first main fluid passage 10a. Second charge check valve 74 in charge check valve enlargement unit 97 or 97A is disposed across hole 102b or 105b in charge check valve enlargement unit 97 or 97A serving as second main fluid passage 10b. Therefore, charge check valve enlargement unit 97 or 97A has sufficiently large spaces for arranging first and second charge check valves 74 while reducing lengths of holes 102a and 102b or 105a and 105b in charge check valve enlargement units 97 or 97A serving as first and second main fluid passages 10a and 10b.

With respect to HST 10C, charge check valve enlargement units 97 and 97A serve as the multiplied charge check valve enlargement units attached to center section 93. Therefore, the number of first and second charge check valves 74 is easily increased by multiplying charge check valve enlargement units 97 and 97A, thereby simplifying, standardizing and minimizing center section 93.

With regard to each of HSTs 10, 10A, 10B and 10C, first charge check and relief valve assembly 71 functions as one of the plurality of first charge check valves for supplying fluid from charge fluid passage 10c to first main fluid passage 10a and also functions as a relief valve for releasing excessive fluid from first main fluid passage 10a to charge fluid passage 10c. Second charge check valve assembly 71 functions as one of the plurality of second charge check valves for supplying fluid from charge fluid passage 10c to main fluid passage 10b and also functions as a relief valve for releasing excessive fluid from second main fluid passage 10b to charge fluid passage 10c. Therefore, no additional relief valve has to be provided in addition to each of the first and second charge check and relief valve assemblies 71, thereby reducing the number of valves.

What is claimed is:

1. A hydrostatic transmission comprising:
   a hydraulic pump;
   a hydraulic motor;
   first and second main fluid passages fluidly connecting the hydraulic pump to the hydraulic motor so as to constitute a closed fluid circuit;
   a charge fluid passage;
   a plurality of first charge check valves interposed between the charge fluid passage and the first main fluid passage so as to allow fluid to flow from the charge fluid passage to the first main fluid passage when the first main fluid passage is hydraulically depressed relative to the charge fluid passage; and
   a plurality of second charge check valves interposed between the charge fluid passage and the second main fluid passage so as to allow fluid to flow from the charge fluid passage to the second main fluid passage when the second main fluid passage is hydraulically depressed relative to the charge fluid passage.

2. The hydrostatic transmission according to claim 1, further comprising:
   a center section onto which the hydraulic pump and the hydraulic motor are mounted,
   wherein the center section is formed therein with respective holes serving as the first and second main fluid passages and the charge fluid passage,
   wherein the plurality of first charge check valves include at least one first charge check valve provided in the center section so as to be interposed between the hole serving as the charge fluid passage and the hole serving as the first main fluid passage, and
   wherein the plurality of second charge check valves include at least one second charge check valve provided in the center section so as to be interposed between the hole serving as the charge fluid passage and the hole serving as the second main fluid passage.

3. The hydrostatic transmission according to claim 2,
   wherein the hole serving as the charge fluid passage is disposed between the hole serving as the first main fluid passage and the hole serving as the second main fluid passage,
   wherein a first charge port is formed in the center section so as to extend from the hole serving as the charge fluid passage to the at least one first charge check valve, and
   wherein a second charge port is formed in the center section so as to extend opposite to the first charge port from the hole serving as the charge fluid passage to the at least one second charge check valve.

4. The hydrostatic transmission according to claim 3,
   wherein the holes serving as the first and second main fluid passages have respective open ends at an outer surface of the center section,
   wherein the at least one first charge check valve in the center section is fitted into the open end of the hole serving as the first main fluid passage, and
   wherein the at least one second charge check valve in the center section is fitted into the open end of the hole serving as the second main fluid passage.

5. The hydrostatic transmission according to claim 3,
   wherein the at least one first charge check valve in the center section is disposed across the hole serving as the first main fluid passage, and
   wherein the at least one second charge check valve in the center section is disposed across the hole serving as the second main fluid passage.

6. The hydrostatic transmission according to claim 2, further comprising:
   a charge check valve enlargement unit detachably attached to the center section,
   wherein respective holes serving as the first and second main fluid passages and the charge fluid passage are provided in the charge check valve enlargement unit so as to be joined to the respective holes in the center section, thereby constituting the first and second main fluid passages and the charge fluid passage, and
   wherein one of the plurality of first charge check valves is provided in the charge check valve enlargement unit so as to be interposed between the hole in the charge check valve enlargement unit serving as the charge fluid passage and the hole in the charge check valve enlargement unit serving as the first main fluid passage, and
   wherein one of the plurality of second charge check valves is provided in the charge check valve enlargement unit so as to be interposed between the hole in the charge check valve enlargement unit serving as the charge fluid passage and the hole in the charge check valve enlargement unit serving as the second main fluid passage.

7. The hydrostatic transmission according to claim 6,
   wherein in the joined center section and charge check valve enlargement unit, the joined holes serving as the charge fluid passage are disposed between the joined holes serving as the first main fluid passage and the joined holes serving as the second main fluid passage,
   wherein a first charge port is provided in the charge check valve enlargement unit so as to extend from the hole in the charge check valve enlargement unit serving as the charge fluid passage to the first charge check valve in the charge check valve enlargement unit, and
   wherein a second charge port is provided in the charge check valve enlargement unit so as to extend opposite to the first charge port from the hole in the charge check valve enlargement unit serving as the charge fluid passage to the second charge check valve in the charge check valve enlargement unit.

8. The hydrostatic transmission according to claim 7,
   wherein the first charge check valve in the charge check valve enlargement unit is disposed across the hole in the charge check valve enlargement unit serving as the first main fluid passage, and
   wherein the second charge check valve in the charge check valve enlargement unit is disposed across the hole in the charge check valve enlargement unit serving as the second main fluid passage.

9. The hydrostatic transmission according to claim 8, wherein the charge check valve enlargement unit attached to the center section is multiplied.

10. The hydrostatic transmission according to claim 1,
    wherein the plurality of first charge check valves include a first charge check valve assembly that functions as the first charge check valve for supplying fluid from the charge fluid passage to the first main fluid passage and that also functions as a relief valve for releasing excessive fluid from the first main fluid passage to the charge fluid passage, and wherein the plurality of second charge check valves include a second charge check valve assembly that functions as the second charge check valve for supplying fluid from the charge fluid passage to the second main fluid passage and that also functions as a relief valve for releasing excessive fluid from the second main fluid passage to the charge fluid passage.

* * * * *